United States Patent
Wouhaybi et al.

(10) Patent No.: US 11,693,721 B2
(45) Date of Patent: Jul. 4, 2023

(54) CREATING ROBUSTNESS SCORES FOR SELECTED PORTIONS OF A COMPUTING INFRASTRUCTURE

(71) Applicant: Intel Corporation, Santa Clara, CA (US)

(72) Inventors: Rita H. Wouhaybi, Portland, OR (US); Patricia M. Mwove Shaffer, Chandler, AZ (US); Aline C. Kenfack Sadate, Hillsboro, OR (US); Lidia Warnes, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/485,335

(22) Filed: Sep. 25, 2021

(65) Prior Publication Data

US 2022/0012112 A1   Jan. 13, 2022

(51) Int. Cl.
*G06F 11/34* (2006.01)
*G06F 11/00* (2006.01)
*G06N 20/00* (2019.01)
*G06F 11/30* (2006.01)
*G06F 11/07* (2006.01)

(52) U.S. Cl.
CPC ........ *G06F 11/008* (2013.01); *G06F 11/0709* (2013.01); *G06F 11/3006* (2013.01); *G06F 11/3447* (2013.01); *G06N 20/00* (2019.01)

(58) Field of Classification Search
CPC ............. G06F 11/3447; G06F 11/3452; G06F 11/3006; G06F 11/0709; G06F 11/008; H04L 41/142
See application file for complete search history.

(56) References Cited

U.S. PATENT DOCUMENTS 10,586,164 B1 *   3/2020  Sengupta ............... G06N 7/005
2018/0024868 A1 *  1/2018  Mehta ............... G06F 16/24569
                                                               718/104

(Continued)

OTHER PUBLICATIONS

Deierling, Kevin; "What is a DPU?" Nvidia blog, retrieved from the Internet at https://blogs.nvidia.com/log/2020/05/20/whats-a-dpu-data-processing-unit/; May 20, 2020; 7 pages.

(Continued)

*Primary Examiner* — Yolanda L Wilson
(74) *Attorney, Agent, or Firm* — Alliance IP, LLC

(57) ABSTRACT

A system for generating a robustness score for hardware components, nodes, and clusters of nodes in a computing infrastructure is provided. The system includes a memory and at least one processing device coupled to the memory. The processing device is to obtain first telemetry data associated with a selected portion of a computing infrastructure, and the selected portion includes a first node and a first hardware component. The processing device is further to obtain first metadata associated with the selected portion, input one or more telemetry inputs corresponding to the first telemetry data into a machine learning model, input one or more metadata inputs corresponding to the first metadata into the machine learning model, and generate, from the machine learning model, a first robustness score for the first hardware component representing a health state of the first hardware component.

25 Claims, 10 Drawing Sheets

(56) References Cited

U.S. PATENT DOCUMENTS

| | | | |
|---|---|---|---|
| 2019/0146862 A1* | 5/2019 | Kephart | G06F 11/0709 |
| | | | 714/2 |
| 2019/0362222 A1* | 11/2019 | Chen | G06N 3/0481 |
| 2020/0160207 A1* | 5/2020 | Song | G06F 11/3466 |
| 2021/0192390 A1* | 6/2021 | Iyengar | G06N 20/00 |
| 2021/0264294 A1 | 8/2021 | Zheng et al. | |
| 2021/0374027 A1* | 12/2021 | Joglekar | G06F 11/3072 |
| 2021/0383271 A1* | 12/2021 | Slinger | G06F 11/3409 |
| 2022/0083389 A1* | 3/2022 | Poothia | G06F 9/5027 |
| 2022/0141201 A1 | 5/2022 | Lal et al. | |

OTHER PUBLICATIONS

Wikipedia; "Data Processing Unit," retrieved from the Internet at https://en.wikipedia.org/w/index.php?title=Data_processing_unit&oldid=1032047248; page version dated Jul. 5, 2021; 2 pages.

Brownlee, Jason; "Comparing Classical and Machine Learning Algorithms for Time Series Forecasting," retrieved from https://machinelearningmastery.com/findings-comparing-classical-and-machine-learning-methods-for-time-series-forecasting/; Oct. 31, 2018 (and updated Aug. 5, 2019); 30 pages.

Intel Newsroom; "Intel Unveils Infrastructure Processing Unit," retrieved from https://www.intel.com/content/www/us/en/newsroom/news/infrastructure-processing-unit-data-center.html#gs.em0wsx; Jun. 14, 2021; 7 pages.

\* cited by examiner

US 11,693,721 B2

CREATING ROBUSTNESS SCORES FOR SELECTED PORTIONS OF A COMPUTING INFRASTRUCTURE

TECHNICAL FIELD

The present disclosure relates in general to the field of computers, and more specifically, to creating robustness scores for selected portions of a computing infrastructure.

BACKGROUND

The ever-increasing number of computing infrastructures and reliance on them by entities and individuals makes reliability and up-time of physical elements in the infrastructures a vital concern. Computing infrastructures can have numerous configurations including, but not necessarily limited to, traditional on-site and/or locally owned data centers as well as remote (or "cloud") data centers. More recently, some cloud infrastructures are being massively scaled, for example, to contain tens of thousands of compute hosts with a wide variety of processing units. In addition, complementary memory, storage, and networking resources are generally provisioned along with processing units. An orchestrator is often used to schedule workloads on compute hosts in the infrastructure. Where a computing infrastructure is organized with racks of heterogenous compute hosts, reliability and up-time can be critically important.

BRIEF DESCRIPTION OF THE DRAWINGS

Like reference numbers and designations in the various drawings indicate like elements.

DETAILED DESCRIPTION

Figure 1:
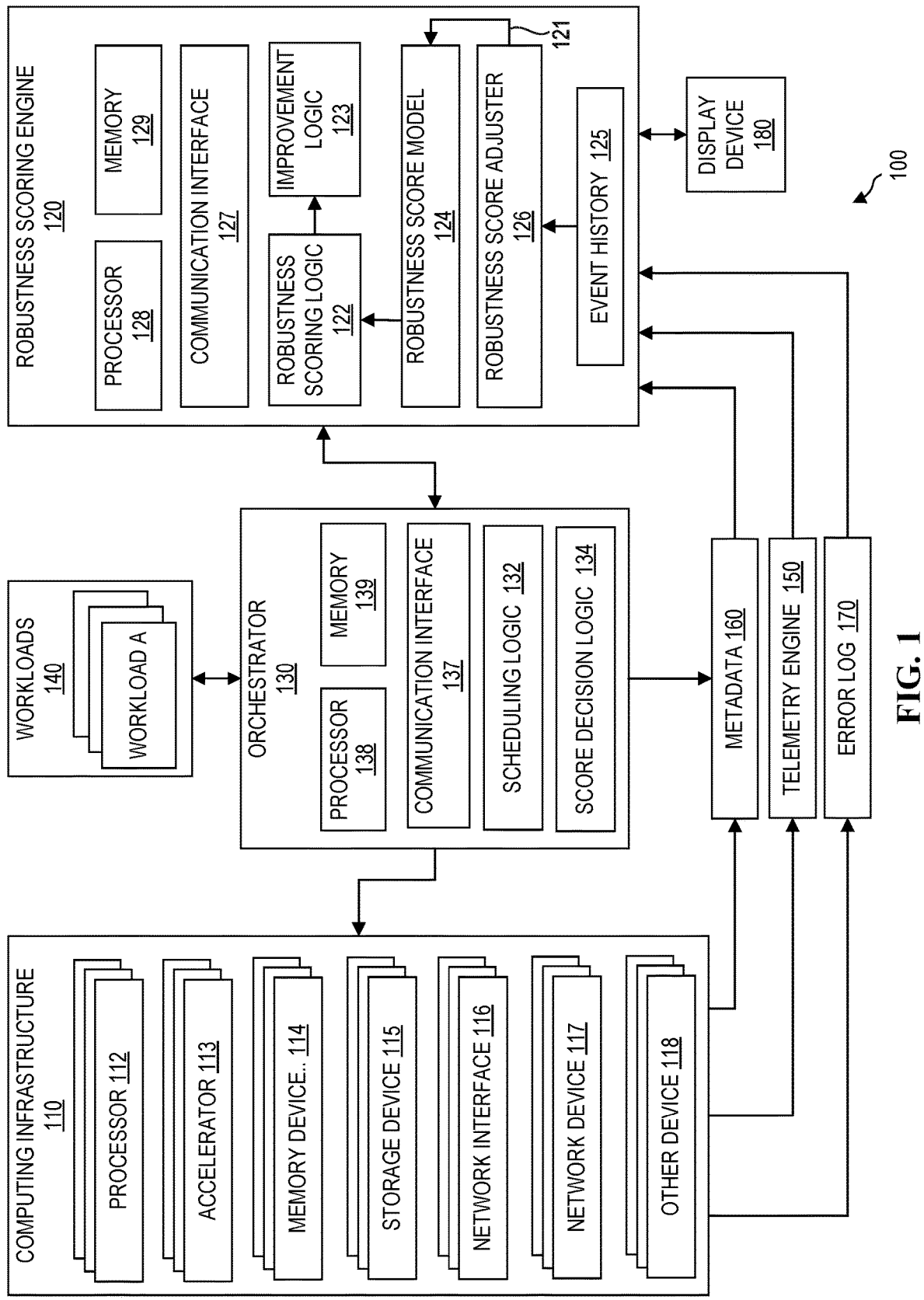
FIG. 1 is a block diagram illustrating a robustness scoring engine, a computing infrastructure, and associated systems according to at least one embodiment.

The following disclosure provides various possible embodiments, or examples, for implementing features disclosed in this specification. These features are related to the use of robustness scores as a measure of the health state of a selected portion in a computing infrastructure. A robustness score may be generated for a selected portion of the computing infrastructure such as a hardware component contained in a node in the computing infrastructure, a node in the computing infrastructure, or a cluster of nodes in the computing infrastructure. The health state is indicative of the reliability, resilience, and remaining lifetime of the selected portion. Generally, a robustness score corresponds to confidence in the robustness of each node or hardware component that can be clustered to create confidence in the up-time and resilience of different parts of the computing infrastructure. As a result, an operator could potentially zoom in for micro assessment of one hardware component, zoom out to assess an individual node, or zoom out in various degrees to assess a rack, a zone, a floor, an entire bank of compute in a building, an entire computing infrastructure, or more.

For purposes of illustrating the several embodiments of a computing infrastructure implemented with a robustness scoring system, it is important to first understand the operations and activities associated with computing infrastructures and disaggregated components. Accordingly, the following foundational information may be viewed as a basis from which the present disclosure may be properly explained.

Today's computing infrastructures may be implemented on-site for an entity (e.g., business, government, school, or other organization, etc.) or remotely (e.g., in a cloud). Cloud computing infrastructures may be accessible privately or publicly and may host and/or provide services to multiple entities and/or individuals. Hardware platforms of computing infrastructures can include disaggregated elements such as general-purpose processors (CPUs), heterogeneous accelerators (xPUs), storage devices, memory, network devices, and infrastructure processing units (IPUs), for example. The hardware platform of a node (also referred to herein as a 'host') can include multiple hardware components, which, in at least some cases, can be the same or similar. For example, a compute node may include one or more central processing units (CPUs), a storage node may include one or more storage devices (e.g., solid-state storage device, etc.), an accelerator node may include one or more accelerators (e.g., GPUs, xPUs, etc.), and a network node may include one or more network devices (e.g., routers, switches, hubs, gateways, etc.). In more traditional, non-disaggregated computing infrastructures, a node can include, e.g., compute, storage, and network hardware components provisioned in the same server. Moreover, accelerators are often implemented in the same node to run in parallel with a more general-purpose CPU.

Reliability of nodes and clusters of nodes within a computing infrastructure can be critically important for example, when workloads are time-sensitive or when workloads are essential to the survival of a business or organization. Mission critical workloads typically need to run on systems that have persistent up-time. At the data center level, an administrator may rely on the nodes to self-report errors and other problems that indicate the health state of the node or that can impact the up-time of the node or a cluster containing the node. Each field replaceable unit (e.g., hardware components of a node) may have its own approach for measuring reliability and such units may not provide consistent or uniform notifications related to their own health and consequent reliability to the administrator. Moreover, some units may not provide notifications in real-time that would be needed to allow mitigation or remediation before a failure occurs. Consequently, corrective actions within a computing infrastructure are often reactive, rather than preventive or proactive.

This can become particularly troublesome for disaggregated computing infrastructure environments. While disaggregated environments offer enormous benefits in terms of computing cost reductions (e.g., as processing data is moved from CPUs to optimized hardware), improved latency (e.g., as xPUs are extricated from CPUs), reduced data movement costs (e.g., as data becomes directly accessible), and improved scalability, complexity of the compute environment may be increased. For example, microservices, which are typically deployed on multiple nodes, may be deployed on significantly more nodes in a disaggregated infrastructure. Consequently, microservices can create a large web of connections and dependencies in a computing infrastructure. Successful delivery of the microservices requires the various nodes hosting the microservice workloads to be ready and reliable.

When computing infrastructures are configured with racks of heterogeneous compute nodes, and IPUs are built on smart network interface cards to offer advanced compute and network capabilities, unplanned downtime of any node or IPU could affect a myriad of workloads and their associated tenants. For example, unplanned downtime of a single node that is hosting modules from many different microservices, could impact all of the associated microservices. Additionally, the downtime could potentially result in significant financial losses to business entities, individuals, cloud service providers, etc.

A robustness scoring system for a computing infrastructure as disclosed herein resolves many of the aforementioned issues (and more). A robustness scoring system is configured for interpreting metadata and telemetry data of nodes, hardware components contained in the nodes, and interfaces of the hardware components in a computing infrastructure, for correlating with error cases observed in the computing infrastructure, and for learning/predicting which components are likely to encounter downtime before they crash. In an embodiment, a robustness scoring engine can be configured to generate a robustness score as a measure of the health state of a selected portion of a computing infrastructure. The selected portion could include, for example, a node, a physical element (e.g., hardware component) of a node, or a cluster of nodes. A cluster of nodes could include any subset of the nodes in the computing infrastructure (e.g., nodes in a rack, a zone, a floor, a building, etc.) or all of the nodes in the computing infrastructure. In some embodiments, the robustness scoring system allows an operator to zoom in for a micro assessment of a particular hardware component (e.g., a processor, an accelerator, a network device, a storage device, or memory device), zoom out to assess a node, and zoom progressively further out to assess various clusters of nodes (e.g., two nodes, three nodes, four nodes, etc.).

In one example, a health state of a selected portion of a computing infrastructure, as measured by the robustness score, can indicate the reliability, resilience, and/or remaining lifetime of the selected portion. Notice of the health state of a selected portion of the computing infrastructure can create a proportional confidence level in the up-time and resilience of the nodes associated with that selected portion. Additionally, notice of the health state of a selected portion of a computing infrastructure can enable appropriate remediation and/or mitigation for any nodes associated with a selected portion that has a robustness score corresponding to a minimum reliability threshold, or reduced reliability threshold, or other similar threshold. Using the reliability thresholds, the robustness scoring system can effectively predict failures in selected portions of a computing infrastructure and use that knowledge to mitigate failures with appropriate preventive actions, enable redeployment of workloads, and initiate self-healing.

Referring now to the FIGURES, FIG. 1 is a block diagram illustrating a computing infrastructure 110, a robustness scoring engine 120, an orchestrator 130, and associated systems in accordance with one or more embodiments. A system 100 includes computing infrastructure 110, robustness scoring engine 120, orchestrator 130, a telemetry engine 150, metadata 160, an error log 170, and a plurality of workloads 140 (e.g., workload A), and associated systems according to at least one embodiment. A display device 180 may provide a user interface, e.g., graphical user interface (GUI), configured to enable user interaction with robustness scoring engine 120 and/or orchestrator 130 to enable different portions of the computing infrastructure to be selected and assessed using the robustness scoring system.

Computing infrastructure 110 includes a plurality of hardware components or elements. The hardware components may include one or more processors (e.g., a processor 112), one or more accelerators (e.g., accelerator 113), one or more memory devices (e.g., memory device 114), one or more storage devices (e.g., a storage device 115), one or more network interfaces (e.g., a network interface 116), one or more network devices (e.g., a network device 117), and/or one or more other elements (e.g., other devices 118). Other devices 118 may include any suitable hardware components of a computing infrastructure, such as power supply elements, cooling elements, or other suitable components. In various embodiments, computing infrastructure 110 may represent any suitable combination of compute nodes, memory nodes, storage nodes, accelerator nodes, and networking nodes comprising various hardware components. For example, computing infrastructure 110 may comprise a datacenter, a communications service provider infrastructure (e.g., one or more portions of an Evolved Packet Core), or other suitable cluster of compute nodes. It should be noted that, other computing infrastructure implementations may also (or alternatively) contain one or more server nodes including any suitable combination of hardware components (e.g., 112-118)

Processor 112 may include one or more processors or processing devices including a central processing unit (CPU) (e.g., single core, multi-core), a microprocessor, embedded processor, a digital signal processor (DSP), a system-on-a-chip (SoC), a co-processor, or any other processing device to execute code. Processor 112 may include any number of processing elements, which may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. In at least one implementation, two or more processing units can be co-located on the integrated circuit (a single chip) to embody two or more corresponding cores. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet, a core and a hardware thread may be viewed by an operating system as individual logical processors, where the operating system is able to individually schedule operations on each logical processor.

An accelerator (e.g., accelerator 113) may include any suitable hardware and logic capable of accelerating certain workloads. An accelerator may be embodied as a processing device such as microprocessor that performs specialized processing tasks on behalf of one or more CPUs. Any specialized processing tasks may be performed by accelerators, such as graphics processing, cryptography operations, machine learning, vision processing, mathematical operations, TCP/IP processing, or other suitable functions. In particular embodiments, accelerator 113 may be coupled to one or more CPUs (e.g., processor 112) via a dedicated interconnect. In particular configurations of computing infrastructure 110, accelerators may comprise programmable logic gates. For example, accelerator 113 may be embodied as a field-programmable gate array (FPGA). Other types of accelerators that may be included in computing infrastructure 110 can include graphics processing units (GPUs), vision processing units (VPUs), deep learning processors (DLPs), and/or application-specific integrated circuits (ASICs), among others. In various configurations, an accelerator node may include multiple accelerators of the same type. In various other configurations, an accelerator node may include multiple accelerators of two or more different types. In some configurations, one or more accelerators may also be located on the same chip as a CPU (e.g., processor 112) in a compute node.

Memory device 114 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory device 114 may be used for short, medium, and/or long term storage of a compute server or disaggregated memory node. Memory device 114 may store any suitable data or information utilized by other elements of the computing infrastructure 110, including software embedded in a computer readable medium, and/or encoded logic incorporated in hardware or otherwise stored (e.g., firmware). Memory devices 114 may store data that is used by cores of processors 112, the cores of accelerators 113, and/or other processing elements of computing infrastructure 110. In some embodiments, memory device 114 may also comprise storage for instructions that may be executed by the cores of processors 112, cores of accelerators 113, and/or other processing elements of computing infrastructure 110 to provide functionality associated with computing infrastructure 110.

Memory devices 114 of a memory node may also store the results and/or intermediate results of the various calculations and determinations performed by processors 112, accelerators 113, and/or other processing elements of the computing infrastructure 110. In various embodiments, memory device 114 may comprise one or more modules of system memory (e.g., RAM) coupled to the processors and accelerators through memory controllers (which may be external to or integrated with the processors and/or accelerators). In various embodiments, one or more particular modules of memory may be dedicated to a particular processor, accelerator, other processing device, or may be shared across multiple processors 112, accelerators 113, or other processing devices.

Storage device 115 may include any suitable characteristics described above with respect to memory device 114. In particular embodiments, storage device 115 may comprise non-volatile memory such as one or more hard disk drives (HDDs), one or more solid state drives (SSDs), one or more removable storage devices, and/or other media. In particular embodiments, a storage device 115 is slower than a memory device 114, has a higher capacity, and/or is generally used for longer term data storage.

Network interface 116 may be used for the communication of signaling and/or data between elements of computing infrastructure 110 and one or more I/O devices, one or more networks coupled to computing infrastructure 110, and/or one or more devices coupled through such networks to the computing infrastructure. For example, network interface 116 may be used to send and receive network traffic such as data packets. In a particular embodiment, network interface 116 comprises one or more physical network interface controllers (NICs), also known as network interface cards, smart NICs, or network adapters. A NIC may include electronic circuitry to communicate using any suitable physical layer and data link layer standard such as Ethernet (e.g., as defined by an IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of computing infrastructure 104 and another device coupled to the computing infrastructure through a network.

Network device 117 may include any suitable characteristics for routing data over a network in computing infrastructure 110 and/or for routing data outside computing infrastructure 110. For example, network devices in computing infrastructure 110 may include one or more of hubs, switches, routers, bridges, gateways, modems, and/or access points, among others. One or more network devices may couple to various ports (e.g., provided by NICs) of network interface 116 and may switch data between these ports and various elements of computing infrastructure 110 (e.g., via one or more Peripheral Component Interconnect Express (PCIe) lanes coupled to processors 112, accelerators 113, memory devices 114, and storage devices 115.

Figure 2:
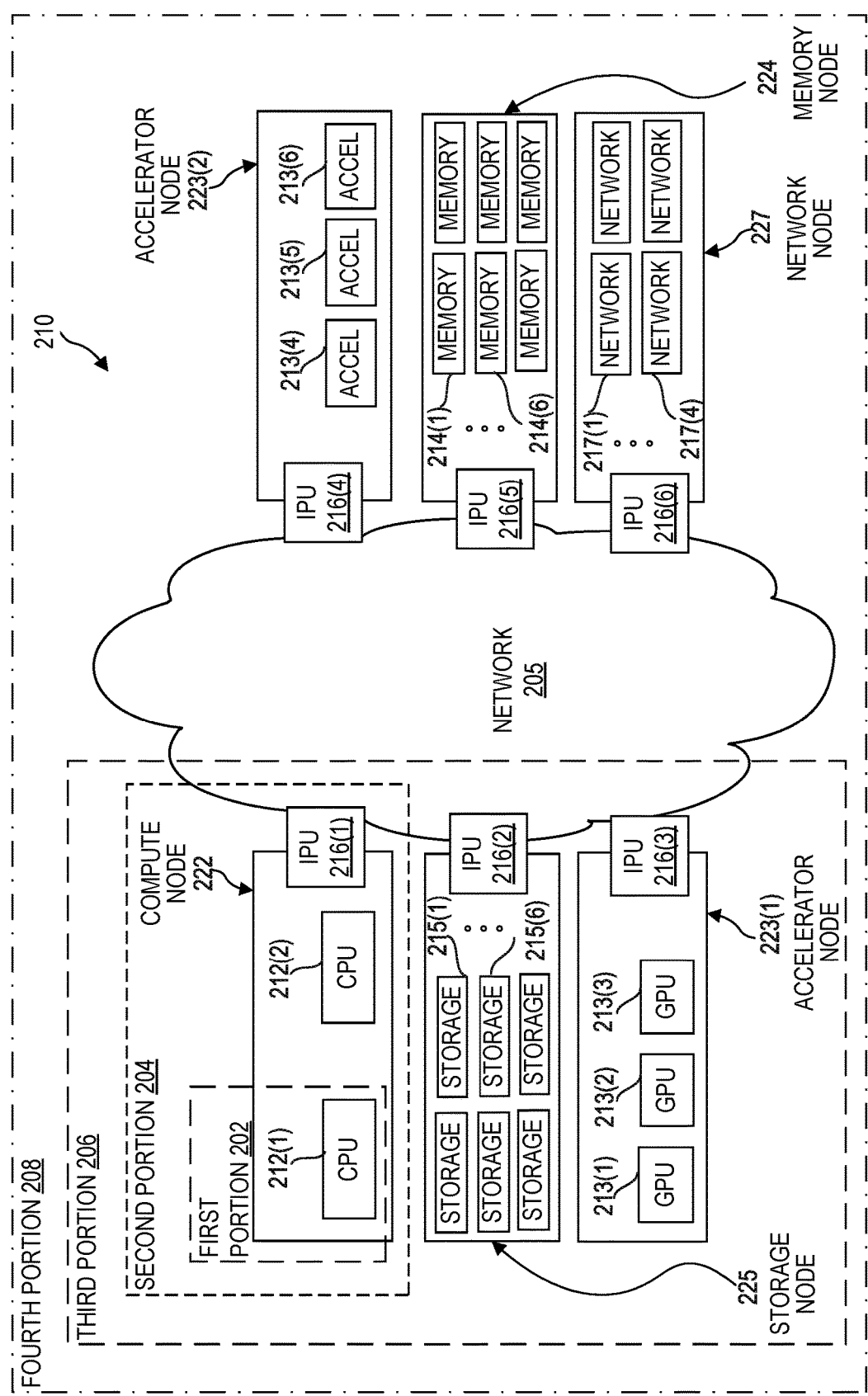
FIG. 2 is a block diagram showing example selected portions of a computing infrastructure for calculating robustness scores according to at least one embodiment.

Referring briefly to FIG. 2, a simplified example implementation of a computing infrastructure 210 with disaggregated elements, including general-purpose processors, heterogeneous accelerators, storage devices, network devices, and infrastructure processing units (IPUs). Computing infrastructure 210 may have any suitable characteristics as described with reference to computing infrastructure 110 and its hardware components 112-118. In computing infrastructure 210, hardware components that are typically incorporated in a compute server, are instead disaggregated from dissimilar hardware components and provisioned in separate nodes with like hardware components.

In this example, computing infrastructure 210 includes a compute node 222, a GPU accelerator node 223(1), another accelerator node 223(2), a memory node 224, a storage node 225, and a network node 227. Compute node 222 includes processors such CPUs 212(1) and 212(2). Storage node 225 includes storage devices 215(1)-215(6). GPU accelerator node 223(1) includes GPUs 213(1)-213(3). Another accelerator node 223(2) includes the same or other types of accelerators 213(4)-213(6) such as, for example, VPUs, FPGAs, ASICs, other xPUs, a combination of different types of accelerators, etc. Memory node 224 includes memory devices 214(1)-214(6). Network node 227 includes network devices (e.g., 117) such as network devices 217(1)-217(4). The hardware components of computing node 222, accelerator nodes 223(1) and 223(2), memory node 224, storage node 225, and network node 227 may have any suitable characteristics described with reference to computing infrastructure 110, or other characteristics. Also, the nodes (e.g., 222, 223(1), 223(2), 224, 225, and 227) of computing infrastructure 210 can communicate over a network 205 via respective infrastructure processing units (e.g., IPUs 216(1)-216(6)), which can each include one or more network interface controllers (NICs).

Referring again to FIG. 1, the elements of computing infrastructure 110 may be coupled together in any suitable manner, such as through a bus or other network (e.g., network 205). A bus may include any suitable interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus, or any other suitable communication mechanism.

Any of the elements of system 100 may be coupled together in any suitable manner such as through one or more networks (e.g., 205). A network may be any suitable network or combination of one or more networks using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium. In various embodiments, an element of system 100 (e.g., orchestrator 130) may communicate through a network with external computing devices requesting the performance of processing operations (e.g., workloads) to be performed by computing infrastructure 110.

One or more physical elements may be combined by, e.g., by orchestrator 130, into a logical machine. For example, a first logical machine may be configured to include a processor 112, a memory device 114, and a network interface 116. In another example, a second logical machine may be configured to include an accelerator 113, a memory device 114, a storage device 115, and a network interface 116. A logical machine may include any combination and quantity of physical elements of computing infrastructure 110. Thus, computing infrastructure 110 may contain a plurality of configured logical machines, with each logical machine configured to contain one or more physical elements.

In one possible configuration of computing infrastructure 110, a logical machine may include a plurality of disaggregated physical elements, where like elements exist on the same nodes as shown by way of example in FIG. 2. In various embodiments, a hardware element of a node may reside on a circuit board. In some embodiments, the circuit board is installed in a chassis, rack, or other suitable structure that comprises multiple nodes coupled together through a network, which may comprise, e.g., a rack or backplane stack.

Workloads 140 may include applications, services, microservices, containers, and/or virtual machines. For example, workload A may comprise a single virtual machine or multiple virtual machines operating together (e.g., a virtual network function (VNF) or a service function chain (SFC)), one or more container instances, and/or other suitable workload. Various embodiments may include a variety of types of guest systems present on the same logical machines or physical elements. In some embodiments, a workload 140 may be generated in response to system 100 receiving a request over a network from a remote computing device.

A virtual machine may emulate a computer system with its own dedicated hardware. A virtual machine may run a guest operating system on top of a hypervisor. The physical elements of a logical machine (e.g., processor 112, memory device 114, storage device 115, network interface 116, etc.) may be virtualized such that it appears to the guest operating system that the virtual machine has its own dedicated components. A virtual machine may include a virtualized NIC (vNIC), which is used by the virtual machine as its network interface. A vNIC may be assigned a media access control (MAC) address, thus allowing multiple virtual machines to be individually addressable in a network.

A hypervisor (also known as a virtual machine monitor) may comprise logic to create and run guest systems. The hypervisor may present guest operating systems run by virtual machines with a virtual operating platform (i.e., it appears to the virtual machines that they are running on separate physical nodes when they are actually consolidated onto a single hardware platform) and manage the execution of the guest operating systems. Services of the hypervisor may be provided by virtualizing in software or through hardware assisted resources that require minimal software intervention, or both. Multiple instances of a variety of guest operating systems may be managed by a hypervisor.

Telemetry engine 150 is operable to capture telemetry data from hardware components and their corresponding interfaces and from the nodes containing the hardware components and corresponding interfaces in the computing infrastructure 110. In some embodiments, the telemetry data is reported periodically to the telemetry engine. In particular embodiments, a critical event such as an overloaded resource (e.g., core) or an excessive temperature may be reported prior to the normal interval for reporting telemetry data (e.g., a notification may be sent immediately upon detection). The telemetry engine 150 may communicate obtained telemetry data to other elements of system 100, such as robustness scoring engine 120, orchestrator 130, or another suitable element. In yet other embodiments or scenarios, the robustness scoring engine 120 may request telemetry data from telemetry engine 150, and the telemetry engine may query the appropriate node and/or hardware component to obtain real-time or most recently collected telemetry data, which can then be provided to robustness scoring engine 120, orchestrator 130, or another suitable element.

Telemetry data can be collected from each hardware component on a node. For example, telemetry can be collected from processors 112 (e.g., CPUs 212(1)-212(2) in compute node 222), accelerators 113 (e.g., GPUs 213(1)-213(3) in accelerator node 223(1), accelerators 213(4)-213(6) in accelerator node 223(2)), memory devices 114 (e.g., memory devices 214(1)-214(6) in memory node 224), storage devices 115 (e.g., storage devices 215(1)-215(6) in storage node 225), and network devices 117 (e.g., network devices 217(1)-217(4) in network node 227). Telemetry data can also be collected from each interface that connects a hardware component to one or more other hardware components. By way of example, telemetry data can be collected from a CPU and its corresponding interface contained in a compute node. The CPU can have internal utilization and error metrics (e.g., for cores and caches) as well as interface utilization and error metrics (e.g., for double data rate (DDR) computer bus, point-to-point processor interconnect, peripheral component interconnect express (PCIe), and others).

Any suitable telemetry data that can be used in robustness score calculations may be collected. In particular, telemetry data that characterizes usage and other information relevant to the health and reliability of a hardware component, an interface of the hardware component, and/or a node containing the hardware component may be collected. For example, the telemetry data may include, but is not necessarily limited to, usage data, utilization metrics (e.g., the percentage of available resources being used), error metrics, power information (e.g., power consumed during designated time periods and/or workloads), and/or temperature information (e.g., ambient air temperature) near the components of the computing infrastructure. One or more of these different types of telemetry data may be obtained for each of the hardware component, the interface of the hardware component, and the node containing the hardware component and its interface.

As specific (but non-limiting) examples, the telemetry data may include processor cache usage, current memory bandwidth usage, and current I/O bandwidth use by each guest system or part thereof (e.g., thread, application, service, etc.) and/or bandwidth of each I/O device (e.g., Ethernet device or hard disk controller). Further telemetry data could include the number of memory accesses per unit of time, and/or the total duration of utilization over the life of a device (e.g., CPU, GPU, VPU, FPGA, ASIC, network processor, switch, hub, router, SSD, HDD, RAM, ROM, NIC, etc.). Utilization metrics can measure the percentage of available resources being used per process (e.g., percentage of total computing power of a node limited to the percentage utilized by a process) or in the aggregate (e.g., percentage of the total computing power used by an individual processor of a node.)

Additional telemetry data may include an amount of available memory space or bandwidth, an amount of available processor cache space or bandwidth. In addition, temperatures, currents, and/or voltages may be collected from various points of the computing infrastructure, such as at one or more locations of each core, one or more locations of chipsets associated with the processors in a computing node, one or more locations of chipsets associated with accelerators in an accelerator node, or other suitable locations of the computing infrastructure 110 (e.g., air intake and outflow temperatures may be measured).

Further telemetry data that may be collected can include any information related to correctable errors encountered by hardware components, their corresponding interfaces, and/or nodes containing the hardware components and interfaces. Error information can include, for example, the type of error and the frequency of errors for the component and/or node. In one or more embodiments, error information may be logged in error log 170, which may be accessed in any suitable manner to obtain the relevant error information (e.g., queried by telemetry engine 150, robustness scoring engine 120, and/or orchestrator 130) to be used by robustness scoring engine when calculating a robustness score. The error log 170 may be stored in any suitable storage including, for example, in orchestrator 130, robustness scoring engine 120, a storage node in computing infrastructure 110, or in a server or other node of computing infrastructure 110.

Further telemetry data can include a current level of redundancy used for maintaining different parts of a computing infrastructure in a functioning state. For example, the level of redundancy of particular hardware components within a node (e.g., number of redundant or backup CPUs in a compute node, number of redundant SSD devices in a memory node, number of GPUs in a GPU accelerator node, etc.), and/or the level of redundancy of particular nodes (e.g., compute node, memory node, accelerator node, network node, storage node) within a rack, floor, building, zone, etc. of the computing infrastructure or within the entire computing infrastructure, etc. may be obtained. Such telemetry data can be an indicator of the health state of the system and can be used to generate a robustness score for a selected portion of the infrastructure. In one example, the level of redundancy for a node or hardware component in a node could be updated whenever a redundancy is used. In these scenarios, the redundancy use could be recorded in error log 170 so that the reduced level of redundancy is obtained as telemetry data to be used for determining a robustness score.

Yet further telemetry data can include resource utilization per application running on a node and/or particular hardware component. For example, the frequency that an application accesses a particular resource (e.g., system memory, main memory, network devices for remote communications, etc.) may collected as part of telemetry data.

In an embodiment, telemetry engine 150 includes a performance monitor, e.g., Intel® performance counter monitor (PCM), to detect, for processors 112 or accelerators 113, processor utilization, core operating frequency, and/or cache hits and/or misses. Telemetry engine 150 may be further configured to detect an amount of data written to and read from, e.g., memory controllers associated with processor 112, accelerator 113, memory device 114, storage device 115, and/or network device 117. In another example, telemetry engine 150 may include one or more Java performance monitoring tools (e.g., jvmstat, a statistics logging tool) configured to monitor performance of Java virtual machines, UNIX® and UNIX-like performance monitoring tools (e.g., vmstat, iostat, mpstat, ntstat, kstat) configured to monitor operating system interaction with physical elements.

Telemetry engine 150 is operable to capture telemetry data from hardware components and their corresponding interfaces and from the nodes containing the hardware components and corresponding interfaces of the computing infrastructure 110. In some embodiments, the telemetry data is reported periodically to the telemetry engine. In particular embodiments, a critical event such as an overloaded resource (e.g., core) or an excessive temperature may be reported prior to the normal interval for reporting telemetry data (e.g., a notification may be sent immediately upon detection). The telemetry engine 150 may communicate obtained telemetry data to other elements of system 100, such as robustness scoring engine 120, orchestrator 130, or another suitable element.

Any suitable metadata 160 that can be used to generate a robustness score may be obtained. In particular, metadata describing a node or a particular hardware component contained in the node may be collected. For example, metadata can pertain to compute nodes (e.g., compute node 222), accelerator nodes (e.g., accelerator nodes 223(1)-223(2)), memory nodes (e.g., memory nodes 224), storage nodes (e.g., storage nodes 225), network nodes (e.g., network nodes 227), and/or any other nodes in a computing infrastructure. Metadata may also pertain to particular hardware components such as processors 112 accelerators 113 (e.g., GPUs 213(1)-213(3), accelerators 213(4)-213(6)), memory devices 114 (e.g., memory devices 214(1)-214(6)), storage devices 115 (e.g., storage device 215(1)-215(6)), and network devices 117 (e.g., network device 217(1)-217(4)). In more traditional computing infrastructures, metadata pertaining to the various servers and their associated hardware components may be collected.

Metadata 160 can be collected and stored in any suitable storage. In an embodiment, some or all metadata may be collected by orchestrator 130 and provided to robustness scoring engine 120. In some implementations, the hardware components and/or nodes of computing infrastructure 110 may be queried for the metadata. In other implementations, orchestrator 130 may be used to collect metadata 160 associated with the various hardware components and/or nodes of computing infrastructure 110.

As specific (but non-limiting) examples, metadata associated with a node (or server) can include age of the node (e.g., installation date, manufacturing date), types of hardware components in the node (e.g., types of processors, memory, storage, accelerators, etc.), and/or identification of installed software and possibly the date of the software installation. Metadata can also pertain to particular hardware components in a node. For example, the type of hardware component (e.g., manufacturer, product identifier, number of cores, size of cache, size of storage devices, size of memory, etc.). For replaceable hardware components in a node, metadata can be collected that includes the age of the hardware components if it differs from the age of the node itself. Metadata can also include location information (e.g., geographical location and/or indoor positioning within a data center). For example, geographical location information could include a physical address (e.g., street, city, state, country). Indoor positioning location information could include rack number, rack configuration (e.g., number of compute nodes), socket identification, node identification, etc.

In the embodiment depicted, robustness scoring engine 120 includes one or more processors 128, memories 129, communication interfaces 127, robustness scoring logic 122, improvement logic 123, a robustness score model 124, and a robustness score adjuster 126. Processor 128 may include any suitable combination of characteristics described herein with respect to processor 112, memory 129 may include any suitable combination of characteristics described herein with respect to memory device 114, communication interface 127 may include any suitable combination of characteristics described herein with respect to network interface 116 or one or more communication buses. Event history 125 can be stored in memory 129 or other storage element having any suitable combination of characteristics described herein with respect to storage device 115.

In at least one embodiment, artificial intelligence (AI) can be used to calculate robustness scores for hardware components in a computing infrastructure. In one example, robustness score model 124 is a pre-trained machine learning forecasting model that can predict a robustness score for a hardware component of a node in a computing infrastructure. The robustness score is related to the expected remaining lifetime (or remaining life) of the hardware component and is predicted based on telemetry data and metadata associated with the hardware component and the node containing the hardware component. Robustness score model 124 may be pre-trained using any suitable type of machine learning where statistical methods and/or algorithms run on a training dataset to train a model to make predictions with new, possibly unknown, inputs. In one example, a training dataset can include telemetry data metadata, and failure data of various types of nodes and hardware components contained in the nodes of one or more computing infrastructures. For existing hardware in a computing infrastructure, robustness score model 124 could be pre-trained based on telemetry data (e.g., temperature readings, utilization metrics), metadata (e.g., age of components, type of components), and failure/error data collected from the computing infrastructure for a predefined time period.

The telemetry data and metadata in the training dataset may include any suitable telemetry data and metadata as previously described herein. The training dataset can include telemetry data, metadata, and failure data for hardware components or devices such as processors (e.g., various types of single-core and multi-core CPUs, microprocessors, embedded processors, digital signal processor (DSP), a system-on-a-chip (SoC), a co-processor, or any other processing device to execute code), accelerators (e.g., microprocessors that perform specialized processing tasks such as graphics processing (GPUs), cryptography operations, machine learning (DLPs), vision processing (VPUs), mathematical operations (FPGAs), TCP/IP processing, and other suitable functions, ASICs, and/or FPGAs), memory devices (e.g., magnetic media, tape drives, optical media, RAM, ROM, EPROM, EEPROM, flash memory, removable media, and any other memory component), storage devices (e.g., SSD, HDD, etc.), network interfaces (e.g., NICs, wireless NICs, vNICs, smart NICs, network adapters, IPUs, etc.), network devices (e.g., network processors, switches, hubs, routers, gateways, bridges, modems, access points, etc.), and interfaces of the hardware component for communicating with other components. The training dataset can also include telemetry data, metadata, and failure data for nodes (e.g., compute nodes, accelerator nodes, memory nodes, storage nodes, network nodes, server nodes) that contain the hardware components.

The robustness score model 124 can generate a robustness score at the micro-level for any selected hardware component of a node in a computing infrastructure. Additionally, robustness scoring logic 122 can calculate robustness scores for individual nodes and any macro-level cluster of nodes in a computing infrastructure. For example, robustness scoring logic 122 could calculate a robustness score for the entire computing infrastructure, for a cluster of any number of nodes, or for a particular node. A selected cluster of nodes for which a robustness score could be calculated may include, for example, one or more racks of nodes (e.g., rack of compute nodes), one or more zones within the computing infrastructure, a cluster of any number of similar nodes, a cluster of any number of dissimilar nodes, cluster of nodes in a building, or all of the nodes in the computing infrastructure.

In at least one embodiment, robustness scoring logic 122 can calculate a robustness score for a node based on the robustness scores generated by robustness score model 124 for hardware components contained in the node. Similarly, robustness scoring logic 122 can calculate a robustness score for a cluster of nodes based on the robustness scores calculated for the nodes that form the cluster. In at least one embodiment, the robustness scores for nodes and for clusters of nodes can be calculated using weighted averages. Any suitable criteria can be used to appropriately weight the robustness scores of hardware components being used to calculate a robustness score of a node, or to appropriately weight the robustness scores of nodes being used to calculate a robustness score of a cluster of those nodes. In another example, linear regression may be used to predict the robustness scores of a node based on the robustness scores of the hardware components in the node. Similarly, linear regression may be used to predict the robustness score of a cluster of nodes based on the robustness scores of the nodes in the cluster.

As the computing infrastructure continues to be used, additional telemetry data, event history data, and updated metadata can be collected for the nodes and hardware components. This additional data can be used by robustness score adjuster 126 to retrain the robustness score model 124. Retraining can improve the robustness score model 124, and therefore, can improve the accuracy of robustness score determinations in the future. When retraining results in algorithm adjustments (e.g., new decision branches associated with new hardware behaviors), then the algorithm adjustments are fed back to the robustness score model 124 via a feedback loop 121.

In one or more embodiments, robustness scoring logic 122 (or other logic in robustness scoring engine 120) may be configured to calculate a robustness score for a new hardware component identified as a new hardware type in the computing infrastructure (or for a node containing the new hardware component). In this scenario, it may be desirable to obtain a robustness score for the new hardware component and/or the node containing the new hardware component before the robustness score model 124 has been trained to predict a robustness score for the new hardware type.

In at least one embodiment, a robustness score for a new hardware component can be calculated based on a combination of two or more robustness scores generated for other hardware components identified as different hardware types. In this example, the other hardware components are to have at least some similarities to the new hardware component. For example, a robustness score for a new accelerator may be calculated based on a combination of robustness scores for other accelerators having one or more similar features to the new accelerator. Any suitable calculation that includes two or more robustness scores of other hardware components can be performed (e.g., average, weighted average, etc.).

Enabling a robustness score to be calculated for a new hardware component before the robustness score model 124 is retrained can be beneficial as the robustness score model 124 can be bootstrapped for new hardware as soon as it is provisioned in the computing infrastructure. Subsequently, the robustness score model 124 can be retrained on real telemetry data and metadata from the new hardware (and other new hardware), the new hardware's interface, and an associated node to more accurately predict robustness scores for the new hardware.

As robustness scores are calculated for various clusters in the computing infrastructure, improvement logic 123 may be configured to perform robustness score testing for a cluster of nodes in order to make recommendations for changes that may improve the performance of the cluster. In robustness score testing of a cluster of nodes, a robustness score of an alternative node is used instead of a robustness score of a selected existing node in the cluster, together with the robustness scores of other existing nodes in the cluster to calculate an alternative robustness score for the cluster. The alternative robustness score of the cluster can be compared to an actual robustness score of the cluster. The actual robustness score of the cluster can be the most recent robustness score that was calculated based on the existing nodes in the cluster, including the existing node selected for testing and possible replacement by the alternative node. Depending on the results of the comparison, changes to the cluster (e.g., replacement of the selected existing node with the alternative node) can be recommended to improve its robustness score.

In one or more embodiments, improvement logic 123 may use the robustness score model 124 and robustness scoring logic 122 to perform a robustness score test on any cluster for which at least one robustness score has been calculated. Additionally, the test may be repeated any number of times with any suitable alternative nodes for the selected existing node, or for other existing nodes in the cluster.

Robustness score adjuster 126 can retrain the robustness score model 124 either periodically or based on a robustness score accuracy limit. A robustness score accuracy limit represents a selected number of wrong decisions made for a particular hardware component based on a robustness score. Once the accuracy limit is met or exceeded, robustness score adjuster 126 retrains the robustness score model 124. As the robustness score model 124 continues learning, the accuracy limit can be adjusted based on the learning. For example, if the accuracy limits are high, then errors may not be detected but retraining is minimized. If the accuracy limits are low, then more errors may be detected but more retraining is performed. The accuracy limit can be adjusted as need to find a desired balance.

Event history 125 used in retraining the robustness score model 124 may be collected by robustness scoring engine 120 and fed into robustness score adjuster 126. Event history 125 can include any event that provides information related to the health state of a particular node and/or hardware element. Nonlimiting examples of event history can include one or more of failure data, error data, conditions associated with a failure event or error event, frequency of errors, and corrective actions (if any) related to a hardware component and/or a node containing the hardware component. In addition, event history 125 can also include an indication of a robustness score corresponding to a hardware component when a particular event occurred, to enable learning from previous robustness scores that were generated. The accuracy of the previous robustness scores can be used by robustness score adjuster 126 in retraining the robustness score model 124 to more accurately predict failures or errors and to adjust the robustness score accordingly.

The AI algorithms can also be used to monitor how much redundancy is being used. For example, redundancy of a node or hardware component may be used as telemetry input to robustness score model 124 to produce a robustness score for a hardware component. As previously described, in one embodiment, the level of redundancy for a node or hardware component may be updated in error log 170 each time a redundant node or hardware component is invoked. The robustness score model 124 can be trained to use the level of redundancy of a node or hardware component, such that a robustness score is appropriately adjusted (e.g., downward for a lower robustness score) as the redundancy level is reduced. In one example of robustness score model 124, the redundancy level may be weighted to more significantly impact the robustness score.

In some cases, including redundancy levels as telemetry input for the robustness score model can help detect security vulnerabilities and enable a preventive action. In this example, the activation of some of the redundant hardware in a compute node (e.g., redundant CPUs) may expose the system to malicious attacks. In one possible attack, a malicious application could attempt to write data patterns that induce errors once the hardware self-healing mechanisms involving sparing has been used and the system is protected by a weaker error correction algorithm. In this scenario, the reduced redundancy condition can be detected (e.g., via error log recordings of CPU redundancy level in the node), used as telemetry input for the robustness score model 124, and reflected in the generated robustness score for the node. When the robustness score is analyzed by score decision logic 134, it can trigger the orchestrator 130 to start migrating workloads on the node to healthier systems.

Orchestrator 130 is configured to activate, control, and configure the physical elements of computing infrastructure 110. The orchestrator 130 is configured to manage combining computing infrastructure physical elements into logical machines, i.e., to configure the logical machines. The orchestrator 130 is further configured to manage placement of workloads onto the logical machines, i.e., to select a logical machine on which to place a respective workload and to manage logical machine sharing by a plurality of workloads. Orchestrator 130 may correspond to a cloud management platform, e.g., OpenStack® (cloud operating system), CloudStack® (cloud computing software) or Amazon Web Services (AWS). Various operations that may be performed by orchestrator 130 include selecting one or more nodes for the instantiation of a virtual machine, container, or other workload and directing the migration of a virtual machine, container, or other workload from particular physical elements or logical machines to other physical elements or logical machines.

Orchestrator 130 may comprise any suitable logic. In various embodiments, orchestrator 130 comprises a processor 138 operable to execute instructions stored in a memory 139 and any suitable communication interface 137 to communicate with computing infrastructure 110 to direct workload placement and perform other orchestrator functions. For example, orchestrator 130 may include scheduling logic 132 to perform at least some of these functions. Orchestrator 130 may also include score decision logic 134 to analyze robustness scores generated by robustness scoring engine 120, to determine an appropriate actions to take (if needed), and to trigger or otherwise cause the actions to be performed.

Score decision logic 134 can analyze a robustness score of a selected portion of the computing infrastructure (e.g., hardware component, node, rack of nodes, zone of nodes, floor of nodes, or any selected cluster of nodes in the computing infrastructure) and determine and trigger an appropriate response or action based on the analysis. In one embodiment, different threshold values can be used by score decision logic 134 to determine a health state of the selected portion of the infrastructure. Confidence in the reliability of the selected portion of the infrastructure may be proportional to the determined health state. If the health state is poor (e.g., robustness score meets a minimum or low reliability threshold), then confidence in its reliability is likely to be low. Conversely, if the health state is good (e.g., robustness score meets a high reliability threshold), then the confidence in its reliability is likely to be high. Additionally, the expected remaining lifetime of a node or hardware component can be predicted based on the health state of the node or hardware component.

The health state of a node and/or hardware element of a node can be used to take appropriate preventive actions to eliminate or reduce failures and unplanned outages. The score decision logic 134 may proactively trigger various types of preventive actions for a node depending on the health state of the node and the capabilities of the node. Nonlimiting examples of preventive actions can include scheduling a maintenance call (or causing it to be scheduled), invoking a redundant node, triggering self-healing on the node, and/or migrating workloads on the node to a healthy node. The capabilities of the node can be used to determine whether a particular preventive action is possible. For example, if the health state of a node is determined to be poor based on the robustness score and an appropriate threshold for that type of node, then the score decision logic 134 may trigger self-healing on the node if self-healing is a capability of the node. Otherwise, if self-healing is not a capability of the node, then the score decision logic 134 may trigger a maintenance call.

Similarly, score decision logic 134 may proactively trigger various types of preventive actions for a hardware component in a node depending on the health state of the hardware component and the capabilities of the hardware component. Nonlimiting examples of preventive actions can include scheduling preventative maintenance (or causing it to be scheduled) and moving workloads before a hardware crash causes an outage, invoking a redundant hardware component on the node, triggering self-healing for the hardware component, attempting to lower the temperature in a highly utilized datacenter and/or rack region of a datacenter).

The capabilities of the hardware component can be used to determine whether a particular preventive action is possible. For example, if the health state of a hardware component is determined to be poor based on the robustness score and an appropriate threshold for that type of hardware component, then the score decision logic 134 may schedule (or cause to be scheduled) a maintenance call if a capability includes replacement of the hardware component. Otherwise, if replacement of the hardware component is not a capability, then the score decision logic 134 may cause the use of the hardware component on the node to be blocked and a redundant hardware component on the node to be activated, if one is available.

The health state of a node can also be used when orchestrating a workload. The score decision logic 134 may trigger appropriate placement, migration, or redeployment of workloads based on a node's health state, which may be determined by analyzing a robustness score of the node based on an appropriate threshold. In one example, the health state may correspond to an expected remaining lifetime of the node or may be used to predict the expected remaining lifetime of the node. When scheduling a workload, orchestrator 130 can use the expected remaining lifetimes of nodes that are needed to host the workload in order to intelligently select nodes for the workload. For example, knowing the expected remaining lifetime of compute nodes in real-time or near real-time allows an orchestrator to intelligently determine which compute node to use for a workload that is short-term (e.g., a compute node with a shorter lifetime expectancy may be used). Conversely, the knowing the expected remaining lifetimes of compute nodes allows the orchestrator to intelligently determine which compute node to use for a workload that needs to run for a long time (e.g., a compute node with a longer lifetime expectancy may be used). Accordingly, predicting and using expected remaining lifetime information offers better optimization in the computing infrastructure.

In some embodiments, the score decision logic 134 may provide expected remaining lifetime information of a node directly to the node. In this implementation, the node may be configured to self-orchestrate a workload if the node is nearing its end of life or is reaching a minimum reliability threshold. Additionally, the node may initiate self-healing if the node has the capability of self-healing.

The score decision logic 134 may make other decisions based on the robustness score of a node or hardware component in response to identifying a reduced health state of the node or hardware component. Examples of other decisions may include, but are not necessarily limited to, load balancing workloads to maintain the operating temperature and average utilization below a desired limit, allocating new mission critical workloads on hardware with a robustness score indicating a healthy system, and moving mission critical workloads from hardware with lowered robustness score due to age, utilization, and failure rates.

A robustness score calculated by robustness score model 124 can also allow for an estimate of a potential downtime. The health state of a particular node or hardware component may generally be associated with a certain amount of downtime. Thus, once the health state of a node or hardware component has been determined based on the robustness score and appropriate thresholds, the downtime for that particular node or hardware element can be predicted based on the particular type of node or hardware component and its associated health state.

In at least one embodiment, score decision logic 134 can be used to determine a health state of a cluster of nodes, in addition to individual nodes or hardware components on the nodes. In response to determining that a health state of a cluster of nodes is poor, e.g., based on the robustness score and an appropriate threshold for that cluster, any suitable preventive action may be triggered. For example, if the health state of a rack of compute nodes is determined to be poor based on a robustness score for the cluster meeting a minimum reliability threshold for a cluster of compute nodes, then a preventive action may include migrating existing workloads in the cluster to other healthier systems and/or scheduling a maintenance call. Additionally, the score decision logic 134 can, either automatically or in response to an operator's request, zoom in to analyze robustness scores for nodes and associated hardware components in the cluster. The individual robustness scores of the nodes and hardware components can be analyzed and appropriate actions can be taken for particular nodes and hardware components, based on the analysis.

The robustness scoring system can also include a feedback mechanism that shows the end user whether they have been able to achieve the performance expected from a particular node (e.g., compute node, storage node, accelerator node, network node, memory node, etc.) and/or hardware component. In one example, replacement or removal of a node may be recorded in event history 125. This can be used to compare against an expected overall lifetime of the node. A feedback mechanism (e.g., notification, alert, report, stored in a database, message on a graphical user interface, etc.) may provide appropriate information to a user that indicates whether the node was utilized for more or less than an expected overall lifetime of the node. Thus, such information can reveal whether the expected performance of the node was achieved.

FIG. 2 is a block diagram of a possible configuration of a computing infrastructure 210 (or a part thereof) having disaggregated hardware components. FIG. 2 illustrates example portions of the computing infrastructure that could be selected for assessment using a robustness scoring system, as described herein. For ease of description, FIG. 2 is sometimes described with reference to elements of the robustness scoring system shown in FIG. 1, such as the robustness scoring engine 120 and the orchestrator 130, which may be provisioned in computing infrastructure 210.

As shown in FIG. 2, a first portion 202 includes a single CPU 212(1), which could be assessed using a robustness scoring system. In this case, telemetry data and metadata associated with CPU 212(1) and compute node 222 are provided to a robustness scoring engine (e.g., 120), and used as inputs to a robustness score model (e.g., 124) to determine a robustness score for the CPU 212(1).

A second portion 204 includes only compute node 222, which may be assessed using a robustness scoring system. In this case, robustness scores of hardware components contained in compute node 222 (e.g., CPU 212(1) and CPU 212(2)) can be produced by a robustness score model (e.g., 124), and used by robustness scoring logic (e.g., 122) to calculate a robustness score for the compute node 222. The robustness score can be evaluated by the score decision logic (e.g., 134) and, if needed, appropriate actions can be taken for the node.

In one or more embodiments, it is also possible to zoom out for a macro-level view of a larger portion of the computing infrastructure. The selected portion could be any desired view of the computing infrastructure including, for example, a rack, a zone, a floor, a bank of compute in a building, etc. A third portion 206 is one example of a macro-level view that includes compute node 222, storage node 225, and GPU node 223(1). In this case, robustness scores of hardware components contained in compute node 222 (e.g., CPU 212(1) and CPU 212(2)) can be produced by a robustness score model (e.g., 124), and used by robustness scoring logic (e.g., 122) to calculate a robustness score for the compute node 222. Robustness scores of hardware components contained in storage node 225 (e.g., storage devices 215(1)-215(6)) can be produced by the robustness score model (e.g., 124) and used by the robustness scoring logic (e.g., 122) to calculate a robustness score for the storage node 225. Robustness scores of hardware components contained in GPU node 223(1) (e.g., GPUs 213(1)-213(3)) can be produced by the robustness score model (e.g., 124), and used by the robustness scoring logic (e.g., 122) to calculate a robustness score for GPU node 223(1). A robustness score of the cluster of nodes included in the third portion 206 can be calculated by the robustness scoring logic (e.g., 122) based on the robustness scores generated for the nodes in the third portion 206, including compute node 222, storage node 225, and GPU node 223(1). The robustness score of the cluster of nodes included in the third portion 206 can be evaluated by the score decision logic (e.g., 134) and, if needed, appropriate actions can be taken for the cluster.

In yet another example, a fourth portion 208 is an example of another macro-level view that includes all of the nodes in computing infrastructure 210. In this case, robustness scores of compute node 222, storage node 225, and GPU node 223(1) can be calculated as described with reference to calculating a robustness score of the cluster of nodes in third portion 206. In addition, robustness scores of hardware components contained in accelerator node 223(2) (e.g., accelerator 213(4)-213(6)) can be produced by the robustness score model (e.g., 124), and used by the robustness scoring logic (e.g., 122) to calculate a robustness score for the accelerator node 223(2). Robustness scores of hardware components contained in memory node 224 (e.g., memory devices 214(1)-214(6)) can be produced by the robustness score model (e.g., 124) and used by the robustness scoring logic (e.g., 122) to calculate a robustness score for the memory node 224. Robustness scores of hardware components contained in network node 227 (e.g., network devices 217(1)-217(4)) can be produced by the robustness score model (e.g., 124), and used by the robustness scoring logic (e.g., 122) to calculate a robustness score for network node 227. A robustness score of the cluster of nodes included in the fourth portion 208 can be calculated by the robustness scoring logic (e.g., 122) based on the robustness scores generated for the nodes in the fourth portion 208, including compute node 222, storage node 225, GPU node 223(1), accelerator node 223(2), memory node 224, and network node 227. The robustness score of the cluster of nodes included in the fourth portion 208 can be evaluated by the score decision logic (e.g., 134) and, if needed, appropriate actions can be taken for the cluster, which, in this example, is the entire computing infrastructure.

Figure 3:
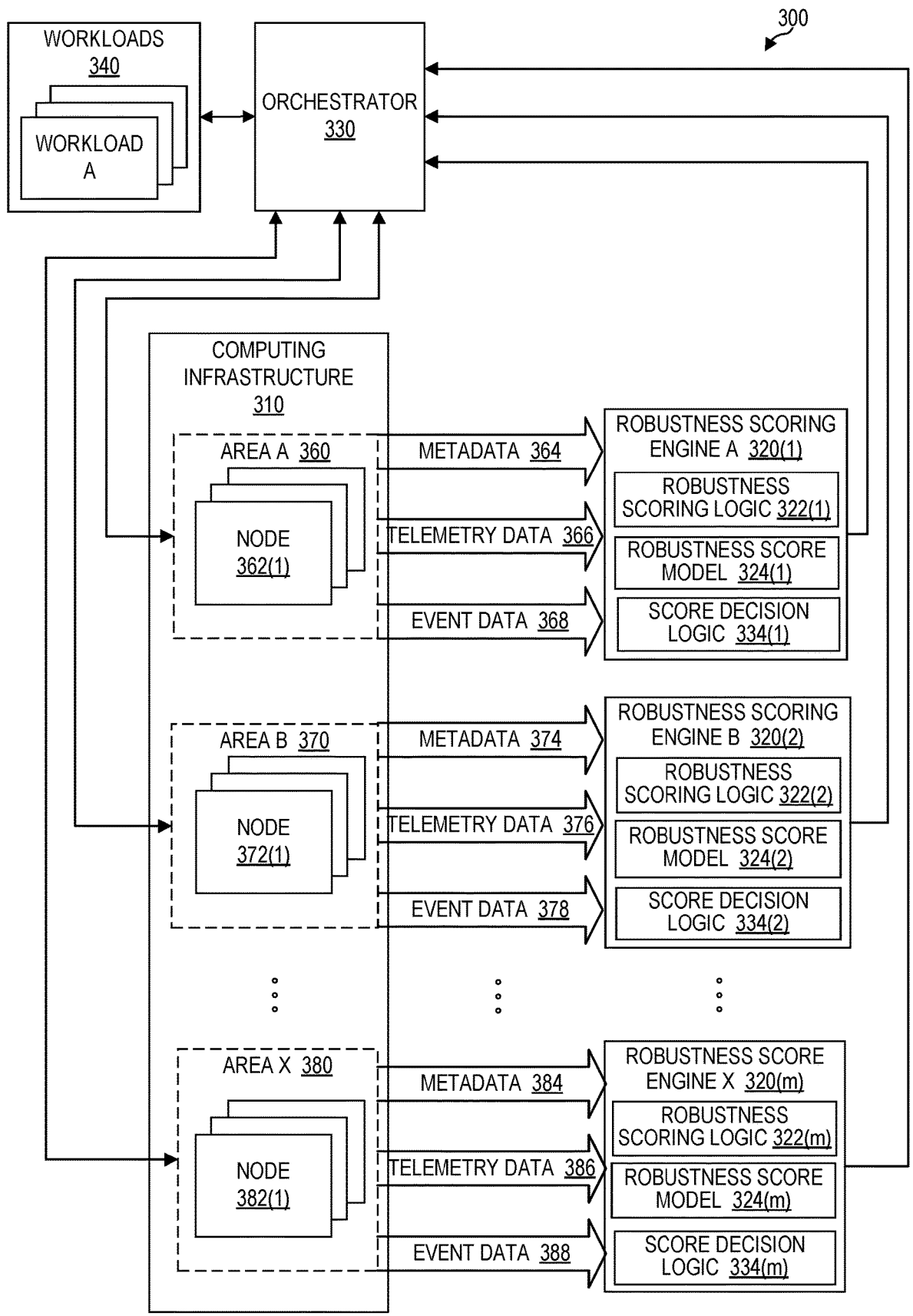
FIG. 3 is a block diagram illustrating a distributed implementation of a robustness scoring engine in a computing infrastructure according to at least one embodiment.

FIG. 3 is a block diagram illustrating a computing infrastructure 310, an orchestrator 330, and a distributed implementation of a robustness scoring engines in the computing infrastructure according to at least one embodiment. A system 300 includes computing infrastructure 310, robustness scoring engines 320(1)-320(m), an orchestrator 330, and a plurality of workloads 340 (e.g., workload A). System 300 may also include other elements (not shown), as previously described herein, such as one or more telemetry engines, one or more error logs, and/or a user interface to enable user interaction with robustness scoring engines 320(1)-320(m) and/or orchestrator 330.

In this example implementation, a pre-trained robustness scoring system could run in a distributed fashion based on defined areas in computing infrastructure 310. As shown in FIG. 2, an area A 360 of computing infrastructure 310 includes a plurality of nodes (e.g., node 362(1), etc.) an area B 370 of computing infrastructure 310 includes a plurality of nodes (e.g., node 372(1), etc.), and an area C 380 of computing infrastructure 310 includes a plurality of nodes (e.g., 382(1), etc.). Robustness score engines 320(1)-320(m) may be configured with robustness scoring logic 322(1)-322(m), robustness score models 324(1)-324(m), and score decision logic 334(1)-334(m), respectively. Robustness score engines 320(1) through 320(m) may be provisioned for areas 360 through 380, respectively, with one robustness score engine for each area of computing infrastructure 310. Robustness score engines 320(1)-320(m) may also include one or more other elements as described with reference to robustness scoring engine 120 of FIG. 1. Robustness scoring logic 322(1)-322(m) may have any of the features of robustness scoring logic 122 of FIG. 1, robustness score models 324(1)-324(m) may have any of the features of robustness score model 124 of FIG. 1, and score decision logic 334(1)-334(m) may have any of the features of score decision logic 134 of FIG. 1.

The areas 360, 370 and 380 may be defined in any suitable way (e.g., by rack, a number of racks, floors, buildings, zones, geographical regions, types of compute, etc.). For example, areas 360, 370, and 380 may each include a number of racks that are monitored and managed by their respective robustness score engines 320(1)-320(m). The robustness score engines may be independently feeding information to orchestrator 330 based on decisions made by respective score decision logic 334(1)-334(m). In another implementation, robustness score engines 320(1)-320(m) may be integrated with the orchestrator 330. Each robustness score engine 320(1)-320(m) collects real time system data such as metadata 364, 374, 384, telemetry data 366, 376, 386, and event data 368, 378, 388. The real time system data is used as input to respective robustness score models 324(1)-324(m) to generate robustness scores for selected portions within a particular area or for a macro-level view of the entire area. The robustness score is used by the appropriate score decision logic 334(1)-334(m) to make decisions based on the generated robustness scores and appropriate thresholds.

Figure 4:
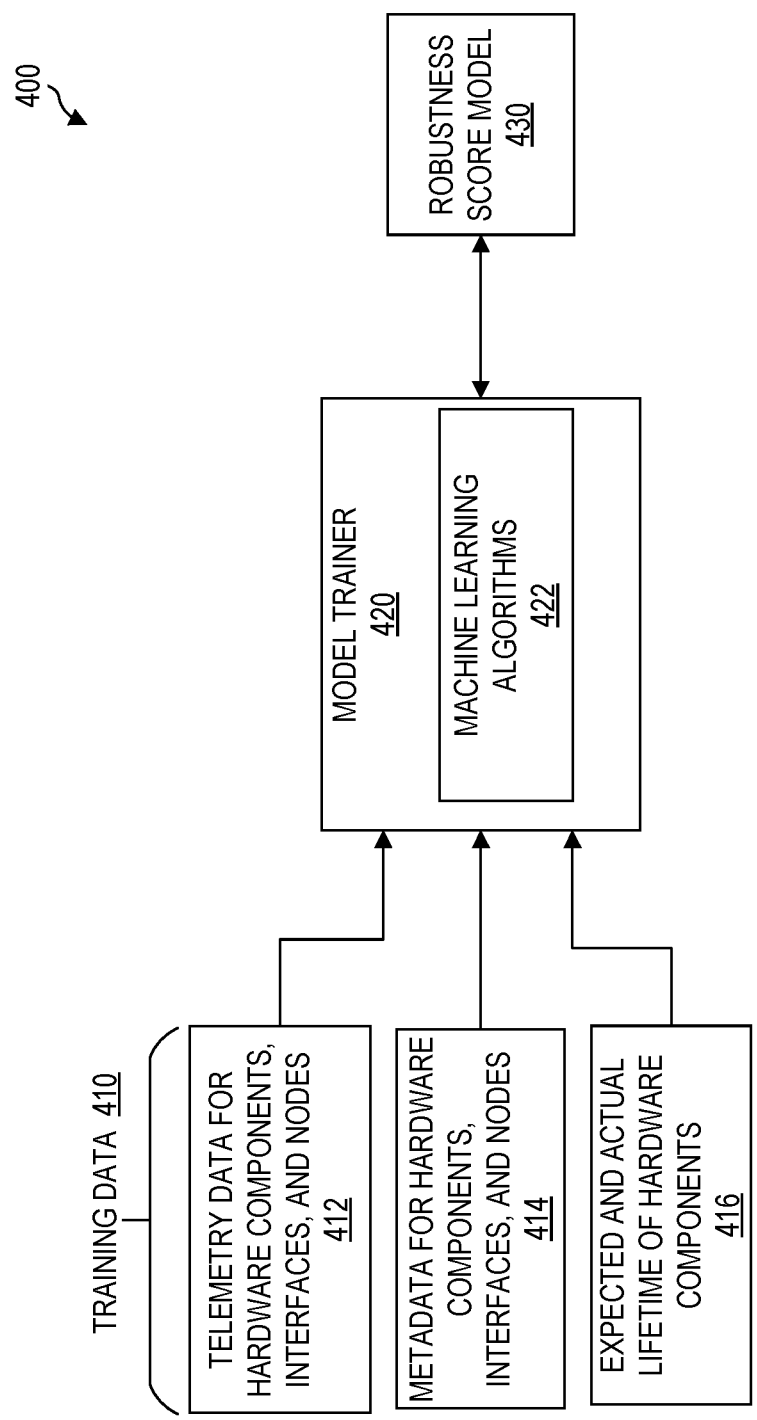
FIG. 4 is a block diagram illustrating an example model trainer for generating a trained model to calculate robustness scores in a computing infrastructure according to at least one embodiment.

FIG. 4 is a block diagram illustrating a model training process 400 that includes an example model trainer 420 for creating a trained robustness score model 430 to calculate robustness scores for a selected hardware component of a node in a computing infrastructure (e.g., computing infrastructures 110, 210 310) according to at least one embodiment. Robustness score model 430 is produced by model trainer 420 and is one possible example of robustness score models (e.g., 124, 324(1)-324(m)) shown and described in this specification.

In the example model training process 400, model trainer 420 can comprise one or more machine learning algorithms 422 that run on training data 410 to learn how to predict the robustness of a hardware component based on the features of the hardware component and the features of the node containing the hardware component. The features can include various types of telemetry data and metadata of the hardware component and its associated node, as previously described herein.

Figure 5:
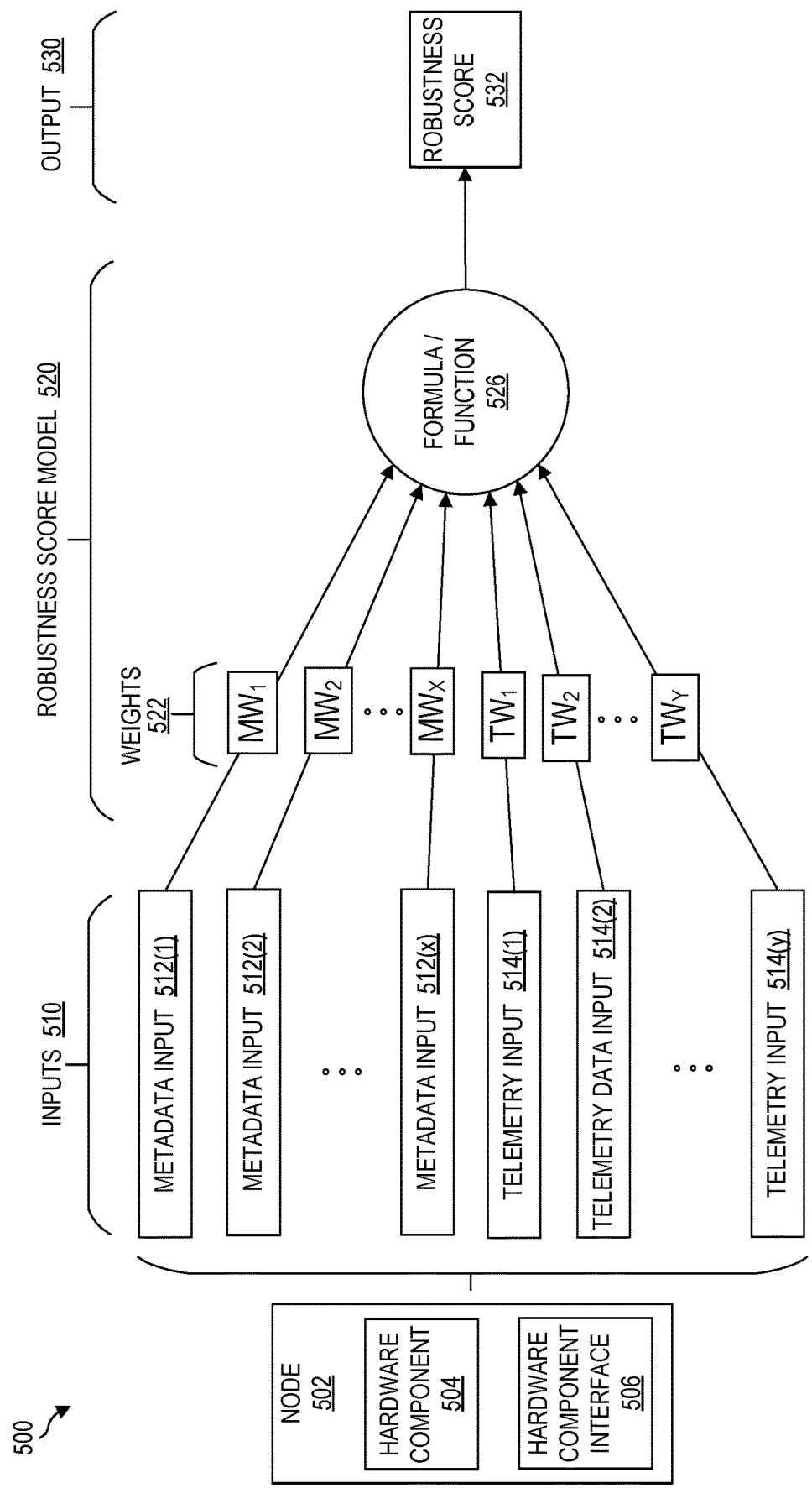
FIG. 5 is a block diagram illustrating a high level operation of an example robustness score model according to at least one embodiment.

Training data 410 to be used by model trainer 420 can include data for many different hardware components and nodes including, for example, all of the hardware components, the interfaces of the hardware components, and the nodes in a computing infrastructure (or multiple computing infrastructures). In one example, training data can include, for each hardware component at various points in time over the lifetime of the hardware component, a mapping at a particular point in time of the telemetry data and metadata for the hardware component to the actual remaining lifetime of that hardware component. Machine learning algorithms 422 can learn how to predict a robustness score for a hardware component based on the correlations between the telemetry data and metadata and the actual remaining lifetime of the hardware component. The robustness score can represent a health state of the component, which may be related to the remaining lifetime of the component based on its current telemetry data and metadata. FIG. 5 is a block diagram illustrating an operation of an example robustness score model according to at least one embodiment. In FIG. 5, a robustness score model 520 is illustrated, which is one example representation of robustness score models (e.g., 124, 324(1)-324(m)) shown and described in this specification. Generally, robustness score model 520 includes one or more formulas and/or functions 526 that receive inputs 510, make a prediction on the inputs 510, and produce an output 530 that represents the prediction.

In this example, inputs 510 to the robustness score model 520 include features of a hardware component 504, a hardware component interface 506, and/or a node 502 containing the hardware component 504 and its interface 506. where the node can be a physical element of a computing infrastructure (e.g., computing infrastructure 110, 210, 310) such as a node or a hardware element of the node. Inputs 510 can include one or more metadata inputs 512(1)-512(x) corresponding to metadata of hardware component 504 and its associated interface 506 and node 502, which has been previously described herein. Inputs 510 can further include one or more telemetry data inputs 514(1)-514(y) corresponding to telemetry data of hardware component 504 and its associated interface 506 and node 502, which has been previously described herein.

Robustness score model 520 can also include weights 522 that are applied to the inputs 510. In this example, weights 522 are illustrated for each input. Weights 522 may be learnable parameters that can be used to give a more or less influence to a particular input when generating a robustness score. Metadata weights $MW_1$-$MW_X$ are applied to metadata inputs 512(1)-512(x), respectively. Telemetry weights $TW_1$-$TW_Y$ are applied to telemetry data inputs, respectfully. Generally, the weights $MW_1$-$MW_X$, and $TW_1$-$TW_Y$ determine how much influence the metadata inputs and telemetry inputs will have on the generation of robustness score 532. Some weights may be neutral such that neither more nor less influence is given to their corresponding input.

In one embodiment of robustness score model 520, a weight may be applied to a metadata input that represents the type of component being assessed by the model. Because the model may be trained to produce robustness scores for a wide variety of hardware component types (e.g., CPU, GPU, VPU, xPU, SSD, HDD, RAM, ROM, NIC, switches, routers, hubs, gateways, etc.), the hardware component type feature may be more heavily weighted if the typical lifetime expectancy varies widely depending on the component type. A heavier weighting could help offset the influence of other feature inputs that may tend to be similar across nodes. This can be important to ensure that the model correctly predicts the robustness of different hardware components that may have similar telemetry data.

It should be noted that any suitable type of machine learning algorithms may be used to train and produce robustness score model 520. Examples of possible types of machine learning could include, but are not necessarily limited to, a classical machine learning system such a classical neural network, a dense and sparse system, a deep learning recommendation system, a graph analytics system, or deep learning with predictive analytics.

Figure 6:
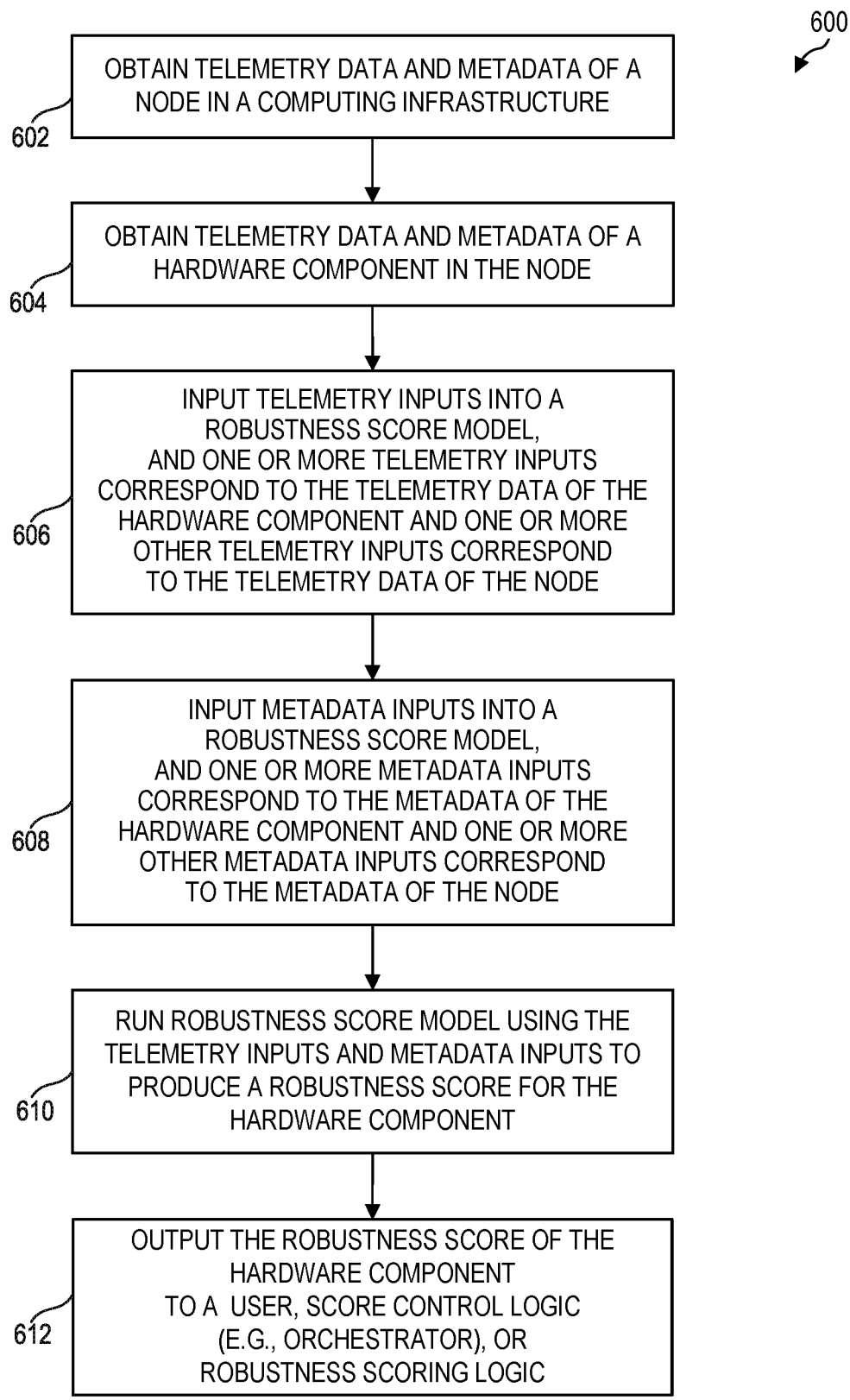
FIG. 6 is a flowchart depicting example operations of a flow for generating a robustness score for a hardware component in a computing infrastructure according to at least one embodiment.

FIG. 6 is a flowchart depicting example operations of a flow 600 for generating a robustness score for a hardware component of a node in a computing infrastructure (e.g., computing infrastructure 110, 210, 310) according to at least one embodiment. A hardware component could include, for example, a processor (e.g., CPU), an accelerator (e.g., GPU, VPU, ASIC, FPGA), a memory device (e.g., RAM, ROM), a storage device (e.g., SSD, HDD), or a network device (e.g., network processor, switch, router, hub, gateway, access point). In an embodiment, one or more operations of flow 600 may be performed, e.g., by robustness scoring engine 120 or some other suitable entity of system 100. In a distributed system implementation, one or more operations of flow 600 may be performed, e.g., by a robustness scoring engines 320(1)-320(m) and/or some other suitable entity of system 300. One or more operations of flow 600 may be performed for example by robustness scoring logic 122 or 322(1)-322(m) and/or robustness score model 124 or 324(1)-324(m).

Initially, a hardware component may be selected from a computing infrastructure (e.g., computing infrastructure 110, 210, 310) for assessment (e.g., micro-level assessment) using robustness scoring. Generally, operations of flow 600 may be performed for a hardware component periodically, at scheduled times, as part of robustness score determination of a node containing the hardware component, as part of a robustness score determination of a cluster of nodes that includes the node containing the hardware component, and/or in response to a request by a user or another entity for a robustness score of the particular hardware component, a node containing the hardware component, or a cluster of nodes that includes the node. In one example, a user may select the hardware component via a user interface. In another example, the assessment could be scheduled to run automatically at particular days/times, could be run in response to particular conditions or errors that occur, or could be run on an as-needed basis.

At 602, telemetry data and metadata associated with the selected hardware component assessment are obtained. At 604, telemetry data and metadata associated with the node that contains the hardware component are obtained. For example, at least some of the telemetry data associated with the hardware component may be obtained from telemetry engine 150, and/or at least some of the telemetry data of the node may be obtained from the telemetry engine. Some of the telemetry data of the hardware component may be obtained from error log 170, and/or some of the telemetry data of the node may be obtained from the error log. In one or more embodiments, metadata for the node and the hardware component (including the interface of the hardware component) may be collected by and obtained from orchestrator 130, 330. In another example, some or all of the metadata may be obtained directly from the node, from the hardware component, and/or from any storage where the metadata is collected and stored.

At 606, telemetry inputs are inputted into a robustness score model. In one example, one or more of the telemetry inputs correspond to the telemetry data obtained for the hardware component, while one or more other telemetry inputs correspond to the telemetry data obtained for the node.

At 608, metadata inputs are inputted into the robustness score model. In one example, one or more of the metadata inputs correspond to the metadata obtained for the hardware component, while one or more other metadata inputs correspond to the metadata obtained for the node.

At 610, a robustness score for the hardware component may be generated using robustness score model 124, 324(1)-324(m) with inputs that include the telemetry inputs and the metadata inputs for the hardware component and for the node containing the hardware component.

At 612, the robustness score of the hardware component may be output to a user, for example, if the user had requested the robustness score for the hardware component. In another example, the robustness score may be used by robustness scoring logic 122, 322(1)-322(m) as part of a calculation to determine a robustness score for the node containing the hardware component, or as part of a calculation to determine a robustness score for a cluster of nodes that includes the node containing the hardware component.

In yet another example, the robustness score may be provided to score decision logic 134, 334(1)-334(m) for analysis and preventive action, if needed. The score decision logic may be provisioned in orchestrator 130, 330 and/or as part of robustness scoring engine 120, 320(1)-320(m), or in any other suitable entity.

Figure 7:
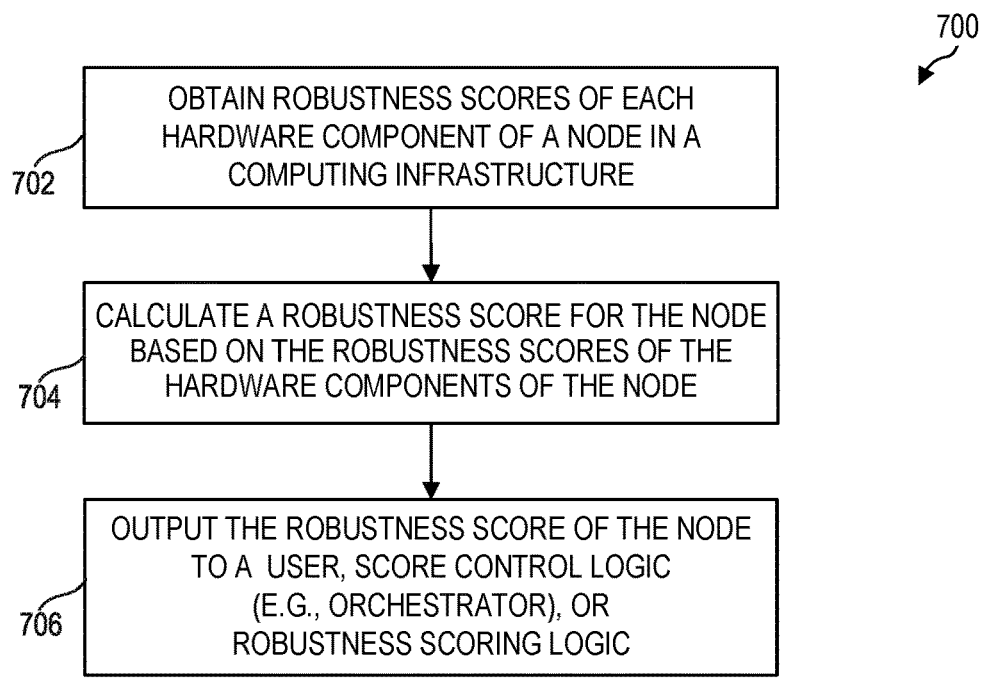
FIG. 7 is a flowchart depicting example operations of a flow for generating a robustness score for a node in a computing infrastructure according to at least one embodiment.

FIG. 7 is a flowchart depicting example operations of a flow 700 for generating a robustness score for a node in a computing infrastructure (e.g., computing infrastructure 110, 210, 310) according to at least one embodiment. A node in the computing infrastructure could include, for example, a compute node, accelerator node, memory node, storage node, network node, server node, etc. In an embodiment, one or more operations of flow 700 may be performed, e.g., by robustness scoring engine 120 or some other suitable entity of system 100. In a distributed system implementation, one or more operations of flow 700 may be performed, e.g., by a robustness scoring engines 320(1)-320(m) and/or some other suitable entity of system 300. One or more operations of flow 700 may be performed for example by robustness scoring logic 122 or 322(1)-322(m) and/or robustness score model 124 or 324(1)-324(m).

Initially, a node may be selected from a computing infrastructure (e.g., computing infrastructure 110, 210, 310) for assessment using robustness scoring. Generally, operations of flow 700 may be performed for a node periodically, at scheduled times, as part of robustness score determination of the node, as part of a robustness score determination of a cluster of nodes that includes the node, and/or in response to a request by a user or another entity for a robustness score of the particular node or a cluster of nodes that includes the node. In one example, a user may select the node via a user interface. In another example, the assessment could be scheduled to run automatically at particular days/times, could be run in response to particular conditions or errors that occur, or could be run on an as-needed basis.

At 702, a respective robustness score for each hardware component contained in the node is obtained. The robustness scores of the hardware components may be obtained, for example, using a process as described with respect to FIG. 6.

At 704, a robustness score is computed for the node based on the robustness scores obtained for the hardware components contained in the node. In one example, the computation can include a weighted average of the robustness scores of the hardware components contained in the node. It should be apparent, however, that any suitable computation may be used to compute a robustness score for the node.

At 706, the robustness score of the hardware component may be output to a user, for example, if the user had requested the robustness score for the node. In another example, the robustness score may be used by robustness scoring logic 122, 322(1)-322(m) as part of a calculation to determine a robustness score for a cluster of nodes that includes the node. In yet another example, the robustness score may be provided to score decision logic 134, 334(1)-334(m) for analysis and preventive action, if needed. The score decision logic may be provisioned in orchestrator 130, 330 and/or as part of robustness scoring engine 120, 320(1)-320(m), or in any other suitable entity.

Figure 8:
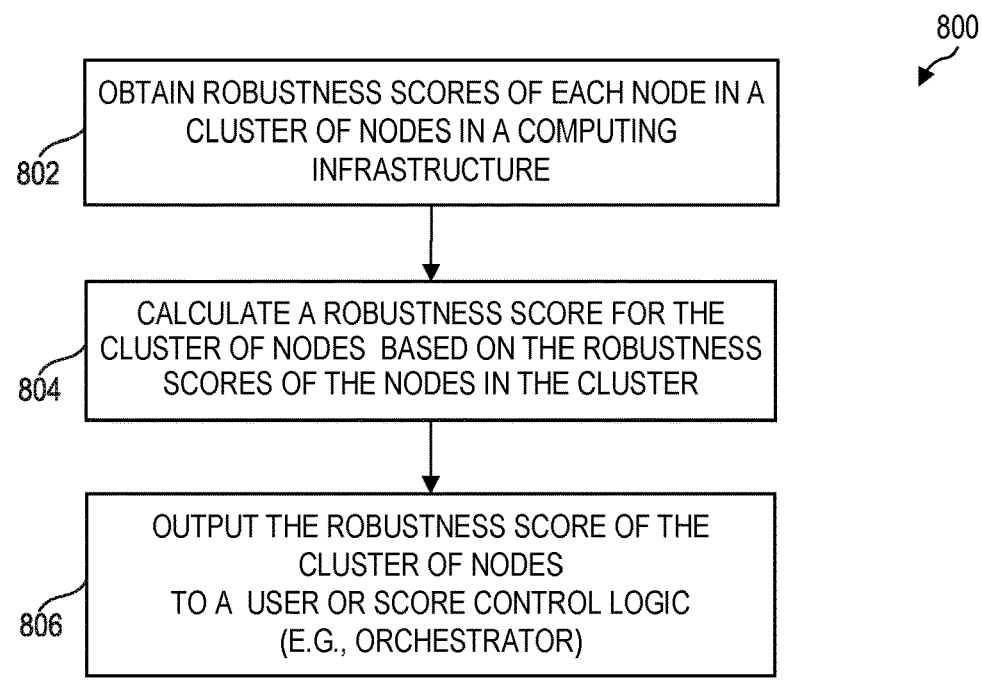
FIG. 8 is a flowchart depicting example operations of a flow for generating a robustness score for a cluster of nodes in a computing infrastructure according to at least one embodiment.

FIG. 8 is a flowchart depicting example operations of a flow 800 for generating a robustness score for a cluster of nodes (i.e., two or more nodes) in a computing infrastructure (e.g., computing infrastructure 110, 210, 310) according to at least one embodiment. A cluster of nodes in the computing infrastructure could include, for example, a rack of nodes in the computing infrastructure, a zone of nodes in the computing infrastructure, a floor housing a portion of the computing infrastructure, a building housing a portion of the computing infrastructure, all of the nodes in a computing infrastructure, etc. In an embodiment, one or more operations of flow 800 may be performed, e.g., by robustness scoring engine 120 or some other suitable entity of system 100. In a distributed system implementation, one or more operations of flow 800 may be performed, e.g., by a robustness scoring engines 320(1)-320(m) and/or some other suitable entity of system 300. One or more operations of flow 800 may be performed for example by robustness scoring logic 122 or 322(1)-322(m) and/or robustness score model 124 or 324(1)-324(m).

Initially, a cluster of nodes may be selected from a computing infrastructure (e.g., computing infrastructure 110, 210, 310) for assessment (e.g., macro-level assessment) using robustness scoring. Generally, operations of flow 800 may be performed for a cluster of nodes periodically, at scheduled times, and/or in response to a request by a user or another entity for a robustness score of the cluster of nodes. In one example, a user may select the cluster of nodes via a user interface. In another example, the assessment could be scheduled to run automatically at particular days/times, could be run in response to particular conditions or errors that occur, or could be run on an as-needed basis.

At 802, a respective robustness score for each node contained in the cluster of nodes is obtained. The robustness scores of the nodes may be obtained, for example, using a process as described with respect to FIG. 7.

At 804, a robustness score is computed for the cluster of nodes based on the robustness scores obtained for the nodes included in the cluster. In one example, the computation can include a weighted average of the robustness scores of the nodes included in the cluster, where the robustness scores of each node is a weighted average of robustness scores of the hardware components of that node. It should be apparent, however, that any suitable computation may be used to compute a robustness score for the cluster of nodes.

At 806, the robustness score of the cluster of nodes may be output to a user, for example, if the user had requested the robustness score for the cluster. In another example, the robustness score may be provided to score decision logic 134, 334(1)-334(m) for analysis and preventive action, if needed. The score decision logic may be provisioned in orchestrator 130, 330 and/or as part of robustness scoring engine 120, 320(1)-320(m), or in any other suitable entity.

Figure 9:
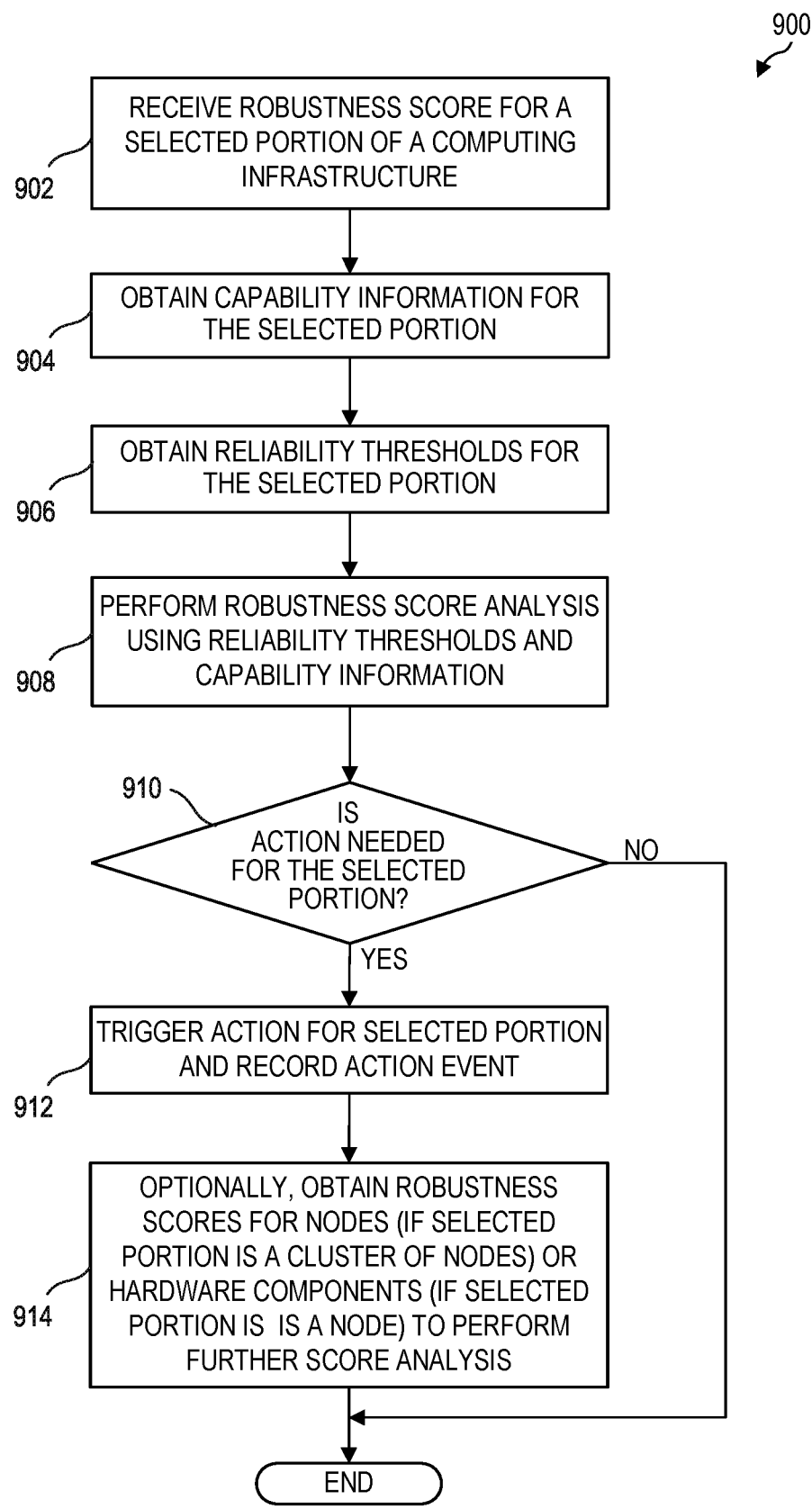
FIG. 9 is a flowchart depicting example operations of a flow for using a robustness score generated for a selected portion of a computing infrastructure according to at least one embodiment.

FIG. 9 is a flowchart depicting example operations of a flow 900 for applying or using a robustness score generated for a selected portion of a computing infrastructure (e.g., computing infrastructure 110, 210, 310) according to at least one embodiment. The selected portion could be a hardware component in a node, a node containing one or more hardware components, or a cluster of nodes in computing infrastructure. A hardware component could include, for example, a processor (e.g., CPU), an accelerator (e.g., GPU, VPU, ASIC, FPGA), a memory device (e.g., RAM, ROM), a storage device (e.g., SSD, HDD), or a network device (e.g., network processor, switch, router, hub, gateway, access point) of a node. A node could include, for example, a compute node, an accelerator node, a memory node, a storage node, a network node, or a server node.

In an embodiment, one or more operations of flow 900 may be performed, e.g., by orchestrator 130 or another suitable entity of system 100. In a distributed system implementation, one or more operations of flow 900 may be performed, e.g., by a robustness scoring engine 320(1)-320(m) and/or by orchestrator 330, or some other suitable entity of system 300. In some examples, operations of flow 900 may be performed responsive to receiving a robustness score generated for the selected portion of the computing infrastructure, for example, by robustness scoring engine 120 or 320(1)-320(m) periodically, at scheduled times, and/or in response to a user request. In other examples, operations of flow 900 may be performed periodically, at scheduled times, and/or in response to a user request using a previously calculated and stored robustness score. One or more operations of flow 900 may be performed for example by score decision logic 134 or 334(1)-334(m). In some embodiments, operations of flowchart 900 may be performed by logic that is integrated or otherwise cooperating with the logic that performs operations of FIGS. 6, 7, and/or 8.

At 902, a robustness score generated for a selected portion of a computing infrastructure is received by the orchestrator or other suitable entity for an analysis to be performed. At 904, capability information of the selected portion may be obtained. At 906, one or more reliability thresholds for the selected portion are obtained to analyze the robustness score. In some examples, the reliability thresholds may be specific to the hardware component (if the selected portion is a hardware component), to the node (if the selected portion is a node), or specific to the cluster of nodes (if the selected portion is a cluster of nodes).

At 908, an analysis is performed on the robustness score using the one or more reliability thresholds and the capability information of the selected portion to determine a health state of the selected portion. Examples of reliability thresholds could potentially include a maximum reliability threshold, a reduced reliability threshold, and a minimum reliability threshold. If the robustness score of a selected portion meets the high reliability threshold, this could indicate that the selected portion of the computing infrastructure is healthy and can run at maximum capacity with any appropriate workloads, storage, and/or network needs for the selected portion. If the robustness score meets the reduced reliability threshold, this could indicate that the selected portion has an average health state but can still be reliably used for certain workloads and/or storage needs. For example, critical or long-running workloads may be placed on a different portion of the computing infrastructure that has a better (e.g., higher) health state. If the robustness score meets the minimum reliability threshold, this could indicate that the selected portion is unhealthy and needs preventive action before a failure occurs.

At 910, based on the health state of the selected portion, a decision is made as to whether a preventive action should be taken, and if so, the type of preventive action that should be taken. In one or more embodiments, the capability information of the selected portion may be used be used in combination with the determined health state (or threshold values) to determine the best action to take for the particular selected portion of the infrastructure. Examples of capability information could include, but are not limited to, the ability of a node or hardware component to self-heal or the ability of a hardware component to be replaced in a node.

Some examples of determining the health state of a selected portion of a computing infrastructure and an appropriate action based on the health state, will now be described. Generally, if a robustness score generated for a selected portion of a computing infrastructure indicates that the selected portion is unhealthy (e.g., based on a minimum reliability threshold), then preventive action can be taken including triggering or causing the orchestrator to migrate any existing workloads running on the selected portion (e.g., a hardware component such as a CPU, GPU, VPU, ASIC, or FPGA, a compute node or accelerator node, or a cluster of at least some compute nodes and/or accelerator nodes) to a healthier portion of the computing infrastructure before a hardware crash causes an outage and/or data loss. Similarly, preventative action can be taken to trigger or cause the orchestrator to migrate any data stored in the selected portion (e.g., a hardware component such as an SSD, HDD, RAM, or ROM, a storage node or memory node, or a cluster of at least some storage nodes and/or memory nodes) to a healthier portion of the computing infrastructure before a hardware crash causes an outage and/or data loss. In addition, the orchestrator may prevent new workloads from being placed on that selected portion and/or prevent new data from being stored in that selected portion until appropriate mitigation has improved the health state of the hardware component, node, or cluster of nodes. Also, preventive maintenance may be triggered to replace hardware components and/or nodes in the selected portion of the infrastructure and/or to add a suitable amount of redundancy to ensure the required uptime is achieved.

In another scenario, if a robustness score declines, e.g., to an average health state based on a reduced reliability threshold, preventive actions can be taken to, for example, schedule preventive maintenance to add suitable amount of redundancy to ensure the required uptime for the selected portion of the computing infrastructure is achieved. In addition, critical and/or long-running workloads on the selected portion may be redeployed by the orchestrator to other, healthier portions of the computing infrastructure. Additionally, the orchestrator may attempt to load balance workloads running in the selected portion to maintain the operating temperature and average utilization below a desired limit.

In another example, a preventive action may include self-healing. One form of self-healing could include post package repair, e.g., on a storage node or memory node. For example, when a robustness score of a hardware component indicates that the hardware component has minimum reliability, a determination may be made as to whether a post package repair has been performed on the node containing the hardware component. If it has not been performed, then a preventive action may include scheduling a post package repair for the node.

Another form of self-healing could include mitigation actions that attempt to increase the life of a node when, for example, a robustness score of a node indicates a low reliability and/or a change in reliability. For example, if the robustness score indicates that the health state of the node has been reduced, a determination can be made as to whether the health state declined faster than expected for that type of node, thus shortening the expected overall lifetime for the node. In this scenario, preventive actions to attempt to extend the life of the node. Such actions can include, for example, reducing the usage of the node. For example, load balancing can be performed, e.g., by the orchestrator, to shift some of the workload to less utilized nodes. By decreasing the usage of the current node, the power and utilization can be decreased to a desired limit and thus, the operating temperature of the node can also be decreased. Such preventive actions may help extend the life of the node.

In another example, if the robustness score of a hardware component or a node indicates that the hardware component or node is unhealthy (e.g., the robustness score meets a minimum reliability threshold), then another preventive action that could be taken is to activate a back-up hardware component or node to replace the unhealthy hardware component or node. A determination can be made as whether a back-up or redundant hardware component or node is available. If so, then it could be activated and workloads and/or data storage could be migrated from the unhealthy hardware component or node to the newly activated hardware component or node.

In yet another example, a preventive maintenance for the hardware component or node by a technician could be scheduled. If the hardware component cannot be repaired by a technician, then it may be replaced. If a hardware element is not replaceable and there are no redundancies of the hardware element in the node, then the node may be replaced (or a back-up node activated).

If it is determined at 910, that an action should be taken based on the health state of the selected portion of the computing infrastructure, then at 912, an appropriate preventive action may be triggered or otherwise initiated by the logic depending on the particular level of the health state. For example, a message can be provided to the orchestrator regarding migrating workloads, load balancing workloads, and/or avoiding certain nodes or clusters of nodes, an alert/message/report can be sent to a user (e.g., via any suitable communication means) advising which action should be taken for which hardware component (e.g., scheduling preventive maintenance or repair, activating redundancies.), etc. In at least one embodiment, an action that is taken may be recorded as an event in the event history 125, which can be used for retraining the robustness score model.

Optionally, if the selected portion is a node and is determined to be unhealthy or less than healthy, then at 914, the robustness engine may zoom in on one or more of the individual hardware components in the node being assessed, and evaluate the robustness scores for the individual hardware components. Similarly, if the selected portion is a cluster of nodes and is determined to be unhealthy or less than healthy, then the robustness engine may zoom in on one or more of the individual nodes in the cluster being assessed, and evaluate the robustness scores for the individual nodes.

In one example, if the selected portion being assessed is a cluster of nodes and its robustness score indicates that the cluster is unhealthy (e.g., robustness score meets a low reliability threshold), then immediate preventive actions such as reducing the workloads in the cluster may be taken. While this occurs, the robustness scores of the individual nodes in the cluster can each be assessed to determine which nodes are unhealthy and need preventive action. By doing this, more targeted preventive actions can be taken for those individual nodes and/or their respective hardware components. Similarly, if the selected portion being assessed is a node and its robustness score indicates that the node is unhealthy (e.g., robustness score meets a low reliability threshold), then immediate preventive actions such as reducing the workloads in the node, load balancing the workloads in the node, reducing the storage in the node (e.g., for a storage node), or activating a backup node may be taken. While this occurs, the robustness scores of the individual hardware components in the node can each be assessed to determine which hardware components are unhealthy and need preventive action. By doing this, more targeted preventive actions can be taken for the unhealthy hardware components of the node, if possible.

Figure 10:
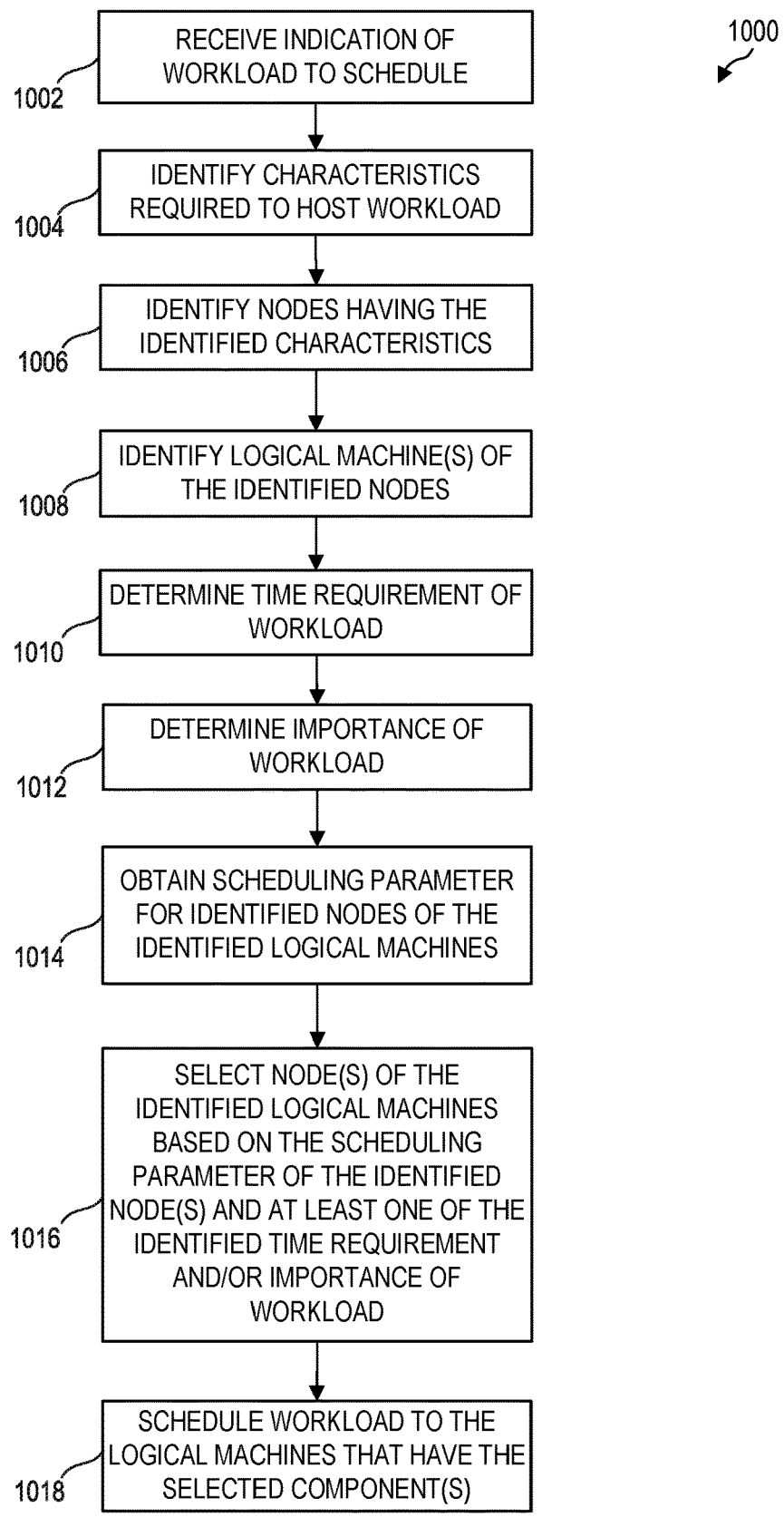
FIG. 10 is a flowchart depicting example operations of a flow for scheduling workloads based on an analysis of a robustness score of a selected portion of a computing infrastructure according to at least one embodiment.

FIG. 10 is a flowchart depicting example operations of a flow 1000 for scheduling workloads in a computing infrastructure (e.g., computing infrastructures 110, 210, 310) based on robustness scores and the health state indicated by the robustness scores according to at least one embodiment. In an embodiment, one or more operations of flow 1000 may be performed, e.g., by orchestrator 130 or some other suitable entity of system 100. In a distributed system implementation, one or more operations of flow 1000 may be performed, e.g., by orchestrator 330 or some other suitable entity of system 300. One or more operations of flow 1100 may be performed for example by scheduling logic 132 provisioned in orchestrator 130.

Operations of this embodiment may begin with receiving an indication of a workload to schedule at 1002. Characteristics of the workload may be identified at 1004. The characteristics may be associated with one or more physical elements included in a computing infrastructure, e.g., computing infrastructures 110, 210, or 310. For example, the types of hardware components that are needed for the workload (e.g., processors, accelerators, storage devices, memory devices, network devices) can be identified. At 1006, nodes that include the identified characteristics for the workload are identified. At 1008, one or more logical machines that have the identified characteristics are identified. At 1010, the time required to run the workload is determined. At 1012, the importance or priority of the workload is determined.

At 1014, scheduling parameters for one or more of the identified nodes of the identified logical machines are obtained. The scheduling parameters may be determined by, for example, score decision logic 134, based on the robustness scores of the identified hardware components. The scheduling parameters can indicate what type of workloads (e.g., any workload, noncritical workloads, short running workloads, etc.) should be scheduled on the node. At 1016, one or more nodes are selected based on the scheduling parameters of the identified nodes and at least one of the identified time requirement and/or the importance of the workload. At 1018, the received workload may be scheduled (e.g., placed) to a logical machine associated with the selected node(s).

Figure 11:
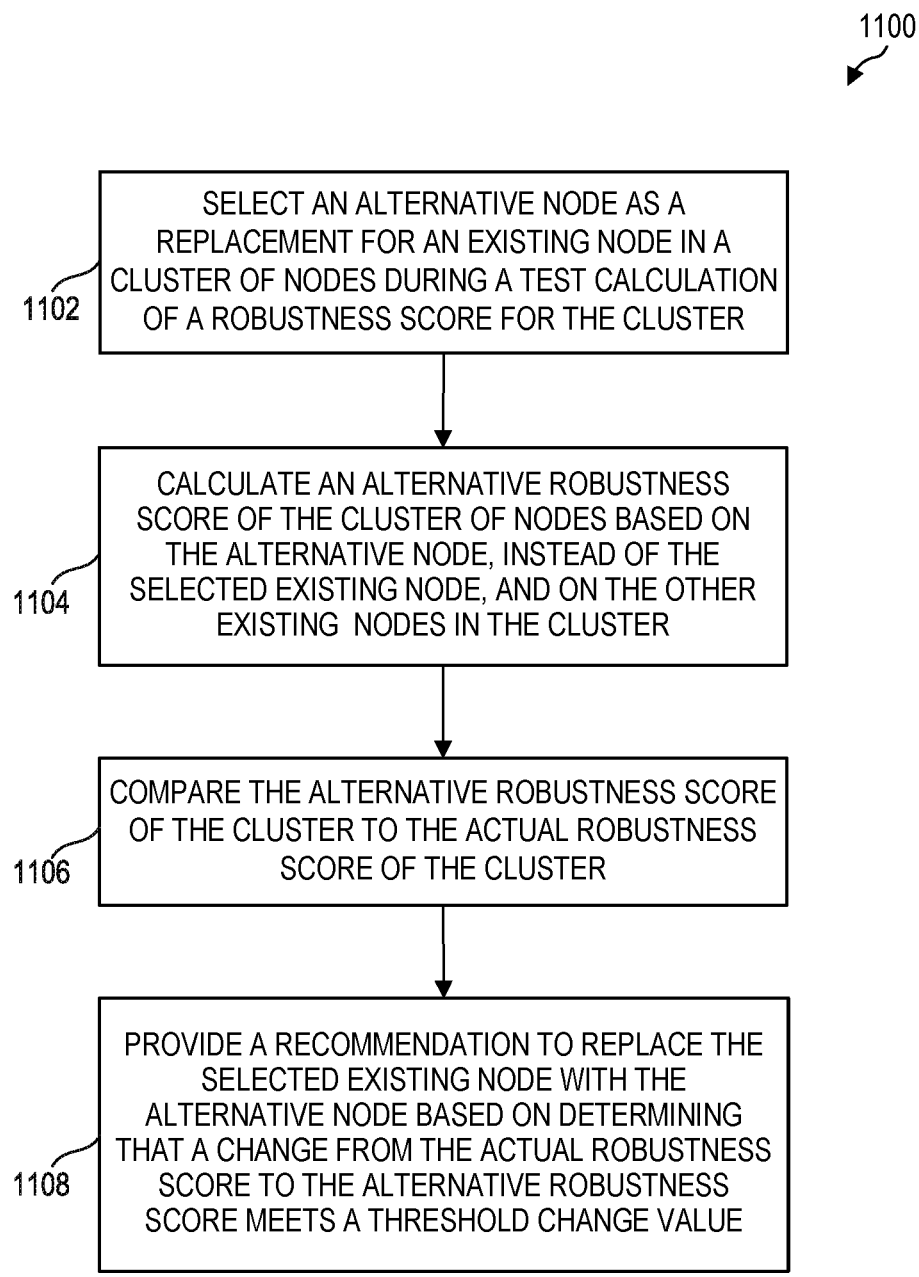
FIG. 11 is a flowchart depicting example operations of a flow for performing robustness score testing for a cluster of nodes according to at least one embodiment.

FIG. 11 is a flowchart depicting example operations of a flow 1100 for performing robustness score testing for a cluster of nodes in a computing infrastructure (e.g., computing infrastructures 110, 210, 310). In an embodiment, one or more operations of flow 1100 may be performed, e.g., by robustness scoring engine 120 or some other suitable entity of system 100. In a distributed system implementation, one or more operations of flow 1100 may be performed, e.g., by robustness scoring engines 320(1)-320(*m*) or some other suitable entities of system 300. One or more operations of flow 1100 may be performed for example by improvement logic 123.

Initially, a cluster of nodes in the computing infrastructure may be selected for testing. At 1102, an alternative node is selected as a replacement for an existing node in the cluster during a test calculation of a robustness score. The actual physical replacement of a selected existing node with an alternative node need not occur to perform test calculations for a cluster nodes. Rather, robustness scores that are used to calculate a robustness score of a particular cluster of nodes are selectively modified based on alternative nodes to perform the test calculations for that cluster.

In one scenario, the selected alternative node may be provisioned in the computing infrastructure and its most recently calculated robustness score may be used in the test calculation. In another example, a robustness score that was calculated for the provisioned alternative node at the beginning of its life may be used in the test calculation. In some scenarios, the alternative node may not currently be provisioned in the computing infrastructure. In this case, a robustness score of the alternative node may be obtained from another computing infrastructure that has provisioned the alternative node and that has calculated at least one robustness score for it. In another scenario, if the alternative node has not been provisioned in the computing infrastructure, then a robustness score for the alternative node may be calculated based on robustness scores of hardware components from the most similar types of nodes actually provisioned in the computing infrastructure.

At 1104, an alternative robustness score can be calculated for the cluster of nodes based on the alternative node instead of the selected existing node, and on the other existing nodes in the cluster. At 1106, the alternative robustness score of the cluster can be compared to the actual robustness score of the cluster. In one example, the difference between the alternative robustness score and the actual robustness score may be evaluated based on a threshold score change value. If the difference does not meet the threshold score change value, then a recommendation may not be made with respect to the currently selected alternative node. However, the test calculation may be repeated any number of times with any suitable alternative node selected as a replacement for the existing node, or for other existing nodes in the cluster.

At 1108, depending on the comparison between the alternative robustness score and the actual robustness score, a recommendation may be made to a user (e.g., operator/administrator) or to score decision logic 134 or other entity in the system, to replace the selected existing node with the alternative node. This recommendation may be made, for example, if the difference between the robustness scores meets the threshold score change value.

"Logic" (e.g., as found in robustness scoring logic 122, 322(1)-322(m), score decision logic 134, 334(1)-334(m), scheduling logic 132, or in other references to logic in this application) may refer to hardware, firmware, software or any suitable combination thereof to perform one or more functions. In various embodiments, logic may include a microprocessor or other processing device or element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

A module or engine as used herein (e.g., robustness scoring engine 120, 320(1)-320(m), refers to any combination of hardware, software, and/or firmware. As an example, a module or engine may include hardware, such as a micro-controller, associated with a non-transitory medium to store code adapted to be executed by the micro-controller. Therefore, reference to a module or engine, in one embodiment, refers to the hardware, which is specifically configured to recognize and/or execute the code to be held on a non-transitory medium. Furthermore, in another embodiment, use of a module or engine refers to the non-transitory medium including the code, which is specifically adapted to be executed by the microcontroller to perform predetermined operations. And as can be inferred, in yet another embodiment, the term module or engine (in this example) may refer to the combination of the microcontroller and the non-transitory medium. Often module or engine boundaries that are illustrated as separate commonly vary and potentially overlap. For example, a first and a second module or engine may share hardware, software, firmware, or a combination thereof, while potentially retaining some independent hardware, software, or firmware. In various embodiments, a module or engine may include any suitable logic.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'configured to,' 'capable of/to,' and/or 'operable to,' in one embodiment, refers to some apparatus, logic, hardware, and/or element designed in such a way to enable use of the apparatus, logic, hardware, and/or element in a specified manner. Note that use of to, configured to, capable of/to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states, such as health states of hardware components, nodes, and clusters of nodes.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

As used herein, unless expressly stated to the contrary, use of the phrase 'at least one of' refers to any combination of the named items, elements, conditions, operations, claim elements, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and Y, but not Z; 5) at least one X and Z, but not Y; 6) at least one Y and Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Reference throughout this specification to "one embodiment" or "an embodiment" means that a particular feature, structure, or characteristic described in connection with the embodiment is included in at least one embodiment of the present disclosure. Thus, the appearances of the phrases "one embodiment" or "an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following examples pertain to embodiments in accordance with this specification. The system, apparatus, method, and machine readable storage medium embodiments can include one or a combination of the following examples:

Example C1 provides one or more machine readable storage media comprising instructions stored thereon, the instructions when executed by a machine, cause the machine to obtain first telemetry data associated with a selected portion of a computing infrastructure and the selected portion including a first node and a first hardware component, obtain first metadata associated with the selected portion, input one or more telemetry inputs corresponding to the first telemetry data into a machine learning model, input one or more metadata inputs corresponding to the first metadata into the machine learning model, and generate, from the machine learning model, a first robustness score for the first hardware component representing a health state of the first hardware component.

Example C2 comprises the subject matter of Example C1, and a first telemetry data input and a first metadata input are associated with the first hardware component.

Example C3 comprises the subject matter of any one of Examples C1-C2, and a second telemetry data input and a second metadata input are associated with the first node.

Example C4 comprises the subject matter of any one of Examples C1-C3, and a third telemetry data input is associated with an interface of the first hardware component.

Example C5 comprises the subject matter of any one of Examples C1-C4, and the first hardware component is selected from a group comprising one or more processors, one or more memory devices, one or more storage devices, one or more network devices, and one or more accelerators.

Example C6 comprises the subject matter of any one of Examples C1-C5, and the instructions when executed by the machine, cause the machine further to re-train the machine learning model based on an event history of the first hardware component and an accuracy limit of the first hardware component.

Example C7 comprises the subject matter of Example C6, the event history indicates a number of failures of the first hardware component, and the accuracy limit indicates a number of errors associated with one or more robustness scores calculated for the first node.

Example C8 comprises the subject matter of any one of Examples C1-C7, and the instructions when executed by the machine, cause the machine further to receive the first telemetry data associated with the first node from a telemetry engine.

Example C9 comprises the subject matter of any one of Examples C1-C8, and the instructions when executed by the machine, cause the machine further to calculate a third robustness score of the first node based on the first robustness score of the first hardware component and a second robustness score of a second hardware component in the first node.

Example C10 comprises the subject matter of Example C9, and the instructions when executed by the machine, cause the machine further to calculate the third robustness score using weighted averages of the first robustness score of the first hardware component and the second robustness score of the second hardware component.

Example C11 comprises the subject matter of Example C10, and the instructions when executed by the machine, cause the machine further to calculate a fourth robustness score of a cluster of nodes including the first node and one or more other nodes, and the fourth robustness score is to be calculated based on the third robustness score of the first node and one or more other robustness scores calculated for the one or more other nodes, respectively.

Example C12 comprises the subject matter of Example C11, and the cluster of nodes compose one of a first plurality of nodes in a rack in the computing infrastructure, a second plurality of nodes in a zone of the computing infrastructure, a third plurality of nodes on a floor of a building containing a portion of the computing infrastructure, a fourth plurality of nodes in a building containing a certain portion of the computing infrastructure, or all nodes in the computing infrastructure.

Example C13 comprises the subject matter of any one of Examples C1-C12, and the instructions when executed by the machine, cause the machine further to perform an analysis of the first robustness score, and to determine whether a preventive action is to be triggered based on the analysis.

Example C14 comprises the subject matter of Example C13, and the instructions when executed by the machine, cause the machine further to generate a scheduling parameter to indicate types of workloads to be placed on the first node based on the analysis, and provide the scheduling parameter to an orchestrator to be used to determine a placement of a first workload on the first node.

Example C15 comprises the subject matter of Example C14, and in response to determining that the first robustness score corresponds to a minimum reliability threshold, the scheduling parameter is to prevent critical workloads from being placed on the first node.

Example C16 comprises the subject matter of any one of Examples C14-C15, and the orchestrator is to determine the placement of the first workload based, at least in part, on the scheduling parameter, a time requirement of the first workload, and a priority of the first workload.

Example C17 comprises the subject matter of any one of Examples C1-C16, and the selected portion of the computing infrastructure includes one of the first hardware component, the first node, or two or more nodes in the computing infrastructure.

Example C18 comprises the subject matter of any one of Examples C1-C17, and the instructions when executed by the machine, cause the machine further to generate a new robustness score for a third hardware component that is a new type of hardware in the computing infrastructure, and generating the new robustness score for the third hardware component is to be based, at least in part, on a combination of two or more robustness scores generated for two or more other hardware components, respectively, and the two or more other hardware components are other types of hardware having at least some similarities to the new type of hardware.

Example C19 comprises the subject matter of Example C18, and the instructions when executed by the machine, cause the machine further to calculate a fifth robustness score of a third node containing the third hardware component based on the new robustness score of the third hardware component and one or more other robustness scores of one or more other hardware components in the third node.

Example C20 comprises the subject matter of any one of Examples C1-C19, and the instructions when executed by the machine, cause the machine further to calculate an alternative robustness score for a cluster of nodes in the computing infrastructure, and to calculate the alternative robustness score is to include replacing a sixth robustness score of a selected existing node in the cluster of nodes with a seventh robustness score of an alternative node, compare the alternative robustness score with an actual robustness score of the cluster of nodes, and provide a recommendation to replace the selected existing node in the cluster of nodes with the alternative node in response to determining a difference between the alternative robustness score and the actual robustness score meeting a score change threshold.

Example S1 provides a system or apparatus, comprising a memory for storing a machine learning model, and at least one processing device coupled to the memory. The processing device is to obtain first telemetry data associated with a selected portion of a computing infrastructure and the selected portion includes a first node and a first hardware component, obtain first metadata associated with the selected portion, input one or more telemetry inputs corresponding to the first telemetry data into a machine learning model, input one or more metadata inputs corresponding to the first metadata into the machine learning model, and generate, from the machine learning model, a first robustness score for the first hardware component representing a health state of the first hardware component.

Example S2 comprises the subject matter of Example S1, and a first telemetry data input and a first metadata input are associated with the first hardware component.

Example S3 comprises the subject matter of any one of Examples S1-S2, and a second telemetry data input and a second metadata input are associated with the first node.

Example S4 comprises the subject matter of any one of Examples S1-S3, and a third telemetry data input is associated with an interface of the first hardware component.

Example S5 comprises the subject matter of any one of Examples S1-S4, and the first hardware component is selected from a group comprising one or more processors, one or more memory devices, one or more storage devices, one or more network devices, and one or more accelerators.

Example S6 comprises the subject matter of any one of Examples S1-S5, and the processing device is further to re-train the machine learning model based on an event history of the first hardware component and an accuracy limit of the first hardware component.

Example S7 comprises the subject matter of Example S6, and the event history indicates a number of failures of the first hardware component, and the accuracy limit indicates a number of errors associated with one or more robustness scores calculated for the first node.

Example S8 comprises the subject matter of any one of Examples S1-S7, and a telemetry engine to obtain the first telemetry data from the first node and the first hardware component.

Example S9 comprises the subject matter of any one of Examples S1-S8, and the processing device is further to calculate a third robustness score of the first node based on the first robustness score of the first hardware component and a second robustness score of a second hardware component in the first node.

Example S10 comprises the subject matter of Example S9, and the processing device is further to calculate the third robustness score using weighted averages of the first robustness score of the first hardware component and the second robustness score of the second hardware component.

Example S11 comprises the subject matter of Example S10, and the processing device is further to calculate a fourth robustness score of a cluster of nodes including the first node and one or more other nodes, and the fourth robustness score is to be calculated based on the third robustness score of the first node and one or more other robustness scores calculated for the one or more other nodes, respectively.

Example S12 comprises the subject matter of Example S11, and the cluster of nodes compose one of a first plurality of nodes in a rack in the computing infrastructure, a second plurality of nodes in a zone of the computing infrastructure, a third plurality of nodes on a floor of a building containing a portion of the computing infrastructure, a fourth plurality of nodes in a building containing a certain portion of the computing infrastructure, or all nodes in the computing infrastructure.

Example S13 comprises the subject matter of any one of Examples S1-S12, and the processing device is further to perform an analysis of the first robustness score, and determine whether a preventive action is to be triggered based on the analysis.

Example S14 comprises the subject matter of Example S13, and the processing device is further to generate a scheduling parameter to indicate types of workloads to be placed on the first node based on the analysis, and provide the scheduling parameter to an orchestrator to be used to determine a placement of a first workload on the first node.

Example S15 comprises the subject matter of Example S14, and in response to determining that the first robustness score corresponds to a minimum reliability threshold, the scheduling parameter is to prevent critical workloads from being placed on the first node.

Example S16 comprises the subject matter of any one of Examples S14-S15, and the orchestrator is to determine the placement of the first workload based, at least in part, on the scheduling parameter, a time requirement of the first workload, and a priority of the first workload.

Example S17 comprises the subject matter of any one of Examples S1-S16, and the selected portion of the computing infrastructure includes one of the first hardware component, the first node, or two or more nodes in the computing infrastructure.

Example S18 comprises the subject matter of any one of Examples S1-S17, and the processing device is further to generate a new robustness score for a third hardware component that is a new type of hardware in the computing infrastructure, and generating the new robustness score for the third hardware component is to be based, at least in part, on a combination of two or more robustness scores generated for two or more other hardware components, respectively, and the two or more other hardware components are other types of hardware having at least some similarities to the new type of hardware.

Example S19 comprises the subject matter Example S18, and the processing device is further to calculate a fifth robustness score of a third node containing the third hardware component based on the new robustness score of the third hardware component and one or more other robustness scores of one or more other hardware components in the third node.

Example S20 comprises the subject matter of any one of Examples S1-S19, and the processing device is further to calculate an alternative robustness score for a cluster of nodes in the computing infrastructure, and to calculate the alternative robustness score is to include replacing a sixth robustness score of a selected existing node in the cluster of nodes with a seventh robustness score of an alternative node, compare the alternative robustness score with an actual robustness score of the cluster of nodes, and provide a recommendation to replace the selected existing node in the cluster of nodes with the alternative node in response to determining a difference between the alternative robustness score and the actual robustness score meeting a score change threshold.

Example M1 provides a method comprising obtaining first telemetry data associated with a selected portion of a computing infrastructure, the selected portion including a first node and a first hardware component, obtaining first metadata associated with the selected portion, inputting one or more telemetry inputs corresponding to the first telemetry data into a machine learning model, inputting one or more metadata inputs corresponding to the first metadata into the machine learning model, and generating, from the machine learning model, a first robustness score for the first hardware component representing a health state of the first hardware component.

Example M2 comprises the subject matter of Example M1, and a first telemetry data input and a first metadata input are associated with the first hardware component.

Example M3 comprises the subject matter of any one of Examples M1-M2, and a second telemetry data input and a second metadata input are associated with the first node.

Example M4 comprises the subject matter of any one of Examples M1-M3, and a third telemetry data input is associated with an interface of the first hardware component.

Example M5 comprises the subject matter of any one of Examples M1-M4, and the first hardware component is selected from a group comprising one or more processors, one or more memory devices, one or more storage devices, one or more network devices, and one or more accelerators.

Example M6 comprises the subject matter of any one of Examples M1-M5, and further comprises re-training the machine learning model based on an event history of the first hardware component and an accuracy limit of the first hardware component.

Example M7 comprises the subject matter of Example M6, and the event history indicates a number of failures of the first hardware component, and the accuracy limit indicates a number of errors associated with one or more robustness scores calculated for the first node.

Example M8 comprises the subject matter of any one of Examples M1-M7, and further comprises obtaining, by a telemetry engine, the first telemetry data from the first node and the first hardware component.

Example M9 comprises the subject matter of any one of Examples M1-M8, and further comprises calculating a third robustness score of the first node based on the first robustness score of the first hardware component and a second robustness score of a second hardware component in the first node.

Example M10 comprises the subject matter of Example M9, and further comprises calculating the third robustness score using weighted averages of the first robustness score of the first hardware component and the second robustness score of the second hardware component.

Example M11 comprises the subject matter of Example M10, and further comprises calculating a fourth robustness score of a cluster of nodes including the first node and one or more other nodes, and the fourth robustness score is to be calculated based on the third robustness score of the first node and one or more other robustness scores calculated for the one or more other nodes, respectively.

Example M12 comprises the subject matter of Example M11, and the cluster of nodes compose one of a first plurality of nodes in a rack in the computing infrastructure, a second plurality of nodes in a zone of the computing infrastructure, a third plurality of nodes on a floor of a building containing a portion of the computing infrastructure, a fourth plurality of nodes in a building containing a certain portion of the computing infrastructure, or all nodes in the computing infrastructure.

Example M13 comprises the subject matter of any one of Examples M1-M12, and further comprises performing an analysis of the first robustness score, and determining whether a preventive action is to be triggered based on the analysis.

Example M14 comprises the subject matter of Example M13, and further comprises generating a scheduling parameter to indicate types of workloads to be placed on the first node based on the analysis, and providing the scheduling parameter to an orchestrator to be used to determine a placement of a first workload on the first node.

Example M15 comprises the subject matter of Example M14, and in response to determining that the first robustness score corresponds to a minimum reliability threshold, the scheduling parameter is to prevent critical workloads from being placed on the first node.

Example M16 comprises the subject matter of any one of Examples M14-M15, and the orchestrator is to determine the placement of the first workload based, at least in part, on the scheduling parameter, a time requirement of the first workload, and a priority of the first workload.

Example M17 comprises the subject matter of any one of Examples M1-M16, and the selected portion of the computing infrastructure includes one of the first hardware component, the first node, or two or more nodes in the computing infrastructure.

Example M18 comprises the subject matter of any one of Examples M1-M17, and further comprises generating a new robustness score for a third hardware component that is a new type of hardware in the computing infrastructure, and generating the new robustness score for the third hardware component is to be based, at least in part, on a combination of two or more robustness scores generated for two or more other hardware components, respectively, and the two or more other hardware components are other types of hardware having at least some similarities to the new type of hardware.

Example M19 comprises the subject matter of Example M18, and further comprises calculating a fifth robustness score of a second node containing the third hardware component based on the new robustness score of the third hardware component and one or more other robustness scores of one or more other hardware components in the second node.

Example M20 comprises the subject matter of any one of Examples M1-M19, and further comprises calculating an alternative robustness score for a cluster of nodes in the computing infrastructure, and to calculate the alternative robustness score is to include replacing a sixth robustness score of a selected existing node in the cluster of nodes with a seventh robustness score of an alternative node, comparing the alternative robustness score with an actual robustness score of the cluster of nodes, and providing a recommendation to replace the selected existing node in the cluster of nodes with the alternative node in response to determining a difference between the alternative robustness score and the actual robustness score meeting a score change threshold.

Example N1 provides an apparatus, the apparatus comprising means for obtaining first telemetry data associated with a selected portion of a computing infrastructure, the selected portion including a first node and a first hardware component, means for obtaining first metadata associated with the selected portion, means for inputting one or more telemetry inputs corresponding to the first telemetry data into a machine learning model, means for inputting one or more metadata inputs corresponding to the first metadata into the machine learning model, and means for generating, from the machine learning model, a first robustness score for the first hardware component representing a health state of the first hardware component.

An Example Y1 provides an apparatus, the apparatus comprising means for performing the method of any one of the Examples M1-M20.

Example Y2 comprises the subject matter of Example Y1, and the means for performing the method comprises at least one processing device and at least one memory element.

Example Y3 comprises the subject matter of Example Y2, and the at least one memory element comprises machine readable instructions that when executed, cause the apparatus to perform the method of any one of Examples M1-M20.

Example Y4 comprises the subject matter of any one of Examples Y1-Y3, and the apparatus is a computing system.

Example Y5 comprises the subject matter of Example Y4, and the computer system is a system-on-a-chip.

An Example X1 provides at least one machine readable storage medium comprising instructions that, when executed, realize a system or implement a method as in any one of Examples S1-S20 or M1-M20.

What is claimed is:

1. One or more non-transitory machine readable storage media comprising instructions stored thereon, the instructions when executed by a machine, cause the machine to:
    obtain first telemetry data associated with a selected portion of a computing infrastructure, the selected portion including a first node and a first hardware component;
    obtain first metadata associated with the selected portion;
    input one or more telemetry inputs corresponding to the first telemetry data into a machine learning model;
    input one or more metadata inputs corresponding to the first metadata into the machine learning model;
    generate, from the machine learning model, a first robustness score for the first hardware component representing a health state of the first hardware component; and
    retrain the machine learning model based, at least in part, on an event history of the first hardware component.

2. The one or more non-transitory machine readable storage media of claim 1, wherein a first telemetry data input and a first metadata input are associated with the first hardware component.

3. The one or more non-transitory machine readable storage media of claim 1, wherein a second telemetry data input and a second metadata input are associated with the first node.

4. The one or more non-transitory machine readable storage media of claim 1, wherein a third telemetry data input is associated with an interface of the first hardware component.

5. The one or more non-transitory machine readable storage media of claim 1, wherein the first hardware component is selected from a group comprising one or more processors, one or more memory devices, one or more storage devices, one or more network devices, and one or more accelerators.

6. The one or more non-transitory machine readable storage media of claim 1, wherein the instructions when executed by the machine, cause the machine further to:
retrain the machine learning model based in part on an accuracy limit of the first hardware component.

7. The one or more non-transitory machine readable storage media of claim 6, wherein the event history indicates a number of failures of the first hardware component, and wherein the accuracy limit indicates a number of errors associated with one or more robustness scores calculated for the first node.

8. The one or more non-transitory machine readable storage media of claim 1, wherein the instructions when executed by the machine, cause the machine further to:
receive the first telemetry data associated with the first node from a telemetry engine.

9. The one or more non-transitory machine readable storage media of claim 1, wherein the instructions when executed by the machine, cause the machine further to:
calculate a third robustness score of the first node based on the first robustness score of the first hardware component and a second robustness score of a second hardware component in the first node.

10. The one or more non-transitory machine readable storage media of claim 9, wherein the instructions when executed by the machine, cause the machine further to:
calculate the third robustness score using weighted averages of the first robustness score of the first hardware component and the second robustness score of the second hardware component.

11. The one or more non-transitory machine readable storage media of claim 10, wherein the instructions when executed by the machine, cause the machine further to:
calculate a fourth robustness score of a cluster of nodes including the first node and one or more other nodes, wherein the fourth robustness score is to be calculated based on the third robustness score of the first node and one or more other robustness scores calculated for the one or more other nodes, respectively.

12. The one or more non-transitory machine readable storage media of claim 11, wherein the cluster of nodes compose one of:
a first plurality of nodes in a rack in the computing infrastructure,
a second plurality of nodes in a zone of the computing infrastructure,
a third plurality of nodes on a floor of a building containing a portion of the computing infrastructure,
a fourth plurality of nodes in a building containing a certain portion of the computing infrastructure, or
all nodes in the computing infrastructure.

13. The one or more non-transitory machine readable storage media of claim 1, wherein the instructions when executed by the machine, cause the machine further to:
perform an analysis of the first robustness score; and
determine whether a preventive action is to be triggered based on the analysis.

14. The one or more non-transitory machine readable storage media of claim 13, wherein the instructions when executed by the machine, cause the machine further to:
generate a scheduling parameter to indicate types of workloads to be placed on the first node based on the analysis; and
provide the scheduling parameter to an orchestrator to be used to determine a placement of a first workload on the first node.

15. The one or more non-transitory machine readable storage media of claim 14, wherein in response to determining that the first robustness score corresponds to a minimum reliability threshold, the scheduling parameter is to prevent critical workloads from being placed on the first node.

16. The one or more non-transitory machine readable storage media of claim 15, wherein the orchestrator is to determine the placement of the first workload based, at least in part, on the scheduling parameter, a time requirement of the first workload, and a priority of the first workload.

17. The one or more non-transitory machine readable storage media of claim 1, wherein the selected portion of the computing infrastructure includes one of the first hardware component, the first node, or two or more nodes in the computing infrastructure.

18. The one or more non-transitory machine readable storage media of claim 1, wherein the instructions when executed by the machine, cause the machine further to:
generate a new robustness score for a third hardware component that is a new type of hardware in the computing infrastructure, wherein generating the new robustness score for the third hardware component is to be based, at least in part, on a combination of two or more robustness scores generated for two or more other hardware components, respectively, wherein the two or more other hardware components are other types of hardware having at least some similarities to the new type of hardware.

19. The one or more non-transitory machine readable storage media of claim 18, wherein the instructions when executed by the machine, cause the machine further to:
calculate a fifth robustness score of a third node containing the third hardware component based on the new robustness score of the third hardware component and one or more other robustness scores of one or more other hardware components in the third node.

20. A system comprising:
a memory for storing a machine learning model; and
at least one processing device coupled to the memory, the processing device to:
obtain first telemetry data associated with a selected portion of a computing infrastructure, the selected portion including a first node and a first hardware component;
obtain first metadata associated with the selected portion;
input one or more telemetry inputs corresponding to the first telemetry data into the machine learning model;
input one or more metadata inputs corresponding to the first metadata into the machine learning model;
generate, from the machine learning model, a first robustness score for the first hardware component representing a health state of the first hardware component; and
retrain the machine learning model based, at least in part, on an event history of the first hardware component.

21. The system of claim 20, wherein a first telemetry data input and a first metadata input are associated with the first hardware component, and wherein a second telemetry data input and a second metadata input are associated with the first node.

22. The system of claim 20, wherein the processing device is further to:
calculate a third robustness score of the first node based on the first robustness score of the first hardware component and a second robustness score of a second hardware component in the first node.

23. The system of claim 20, wherein the processing device is further to:

perform an analysis of the first robustness score; and determine whether a preventive action is to be triggered based on the analysis.

24. A method comprising:

obtaining first telemetry data associated with a selected portion of a computing infrastructure, the selected portion including a first node and a first hardware component;

obtaining first metadata associated with the selected portion;

inputting one or more telemetry inputs corresponding to the first telemetry data into a machine learning model;

inputting one or more metadata inputs corresponding to the first metadata into the machine learning model;

generating, from the machine learning model, a first robustness score for the first hardware component representing a health state of the first hardware component; and retraining the machine learning model based, at least in part, on an event history of the first hardware component.

25. The method of claim 24, wherein a first telemetry data input and a first metadata input are associated with the first hardware component, and wherein a second telemetry data input and a second metadata input are associated with the first node.

* * * * *